(12) United States Patent
Sato et al.

(10) Patent No.: US 7,206,168 B2
(45) Date of Patent: Apr. 17, 2007

(54) THIN FILM MAGNETIC HEAD EQUIPPED WITH TOROIDAL COIL LAYER

(75) Inventors: Kiyoshi Sato, Niigata-ken (JP); Toru Takahashi, Niigata-ken (JP); Hisayuki Yazawa, Niigata-ken (JP)

(73) Assignee: Alps Electric Co., Ltd.

( * ) Notice: Subject to any disclaimer, the term of this patent is extended or adjusted under 35 U.S.C. 154(b) by 414 days.

(21) Appl. No.: 10/795,094

(22) Filed: Mar. 5, 2004

(65) Prior Publication Data
US 2004/0218306 A1    Nov. 4, 2004

(30) Foreign Application Priority Data
Mar. 7, 2003 (JP) ............... 2003-060926
Aug. 14, 2003 (JP) ............... 2003-293378

(51) Int. Cl.
*G11B 5/17* (2006.01)

(52) U.S. Cl. .................... 360/123; 360/126
(58) Field of Classification Search ........ 360/123, 360/126
See application file for complete search history.

(56) References Cited

U.S. PATENT DOCUMENTS

| 5,406,695 A | 4/1995 | Amemori | 29/603.25 |
|---|---|---|---|
| 5,418,668 A * | 5/1995 | Batra | 360/126 |
| 5,969,911 A | 10/1999 | Hikami et al. | 360/317 |
| 6,965,495 B2 * | 11/2005 | Sato et al. | 360/126 |
| 2003/0123186 A1* | 7/2003 | Sano et al. | 360/126 |

FOREIGN PATENT DOCUMENTS

| JP | 62-128011 | 6/1987 |
|---|---|---|
| JP | 01-282715 | 11/1989 |
| JP | 04-356707 | 12/1992 |
| JP | 05-250636 | 9/1993 |
| JP | 06-103526 | 4/1994 |
| JP | 07153026 | 6/1995 |
| JP | 07225918 | 8/1995 |
| JP | 2000311311 | 11/2000 |
| JP | 2001-236614 | 8/2001 |
| JP | 2002-216314 | 8/2002 |
| WO | WO 89/00327 | 1/1989 |

OTHER PUBLICATIONS

The Notification of Reasons for Refusal Issued on Feb. 21, 2006 for corresponding Japanese Patent Application No. 2003-293378.

* cited by examiner

*Primary Examiner*—Jefferson Evans
(74) *Attorney, Agent, or Firm*—Brinks Hofer Gilson & Lione

(57) ABSTRACT

By forming a rearmost second coil piece so as to have a larger width in the track-width direction and a larger area than those of coil pieces, heat generated in a thin-film magnetic head can be effectively released to the rearmost coil piece. Thus, a temperature rise in the thin-film magnetic recording head can be further reduced than is possible today, thereby preventing the thin-film magnetic head from protrusion due to its thermal expansion.

11 Claims, 15 Drawing Sheets

THIN FILM MAGNETIC HEAD EQUIPPED WITH TOROIDAL COIL LAYER

This application claims the benefit of priority to Japanese Patent Application Nos. 2003-060926 and 2003-293378, both of which are herein incorporated by reference in their entirety.

BACKGROUND OF THE INVENTION

1. Field of the Invention

The present invention relates to a recording thin-film magnetic head used for a floating magnetic head, or the like, and more particularly, it related to a thin-film magnetic head having an excellent heat-dissipation characteristic by optimizing the structure of a toroidal coil layer.

2. Description of the Related Art

A recording thin-film magnetic head (inductive head) having core layers and a coil layer has made a progress on the path to miniaturization due to a requirement for a high recording density in recent years; as a result, the coil layer must be formed by winding in a very fine space.

The known coil layer is generally formed by winding around a connecting portion connecting the lower and upper core layers, using a space formed between lower and upper core layers. The coil layer formed in such a way of winding is called a spiral coil.

However, the spiral coil has problems in that, for example, it is difficult to effectively provide a necessary winding number in a fine space; hence, it is believed that the structure of the inductive head formed by winding in a toroidal shape around the core layers serving as a winding shaft will be a main stream in future.

For example, Japanese Unexamined Patent Application Publication No. 5-250636 (hereinafter, referred to as Patent Document 1) has disclosed the structure of the coil layer formed by winding in a toroidal shape around the core layers constituting the inductive head. By using such a toroidal coil layer, a three-dimensional space around the core layers can be effectively utilized, whereby it has been expected that miniaturization of the inductive head can be achieved and magnetization efficiency will be improved.

However, the compact inductive head equipped with the toroidal coil layer especially has the following salient problem. That is, Joule heat generated due to a recording current passing through the coil layer and heat generated due to eddy currents generated in the cores are unlikely to be effectively released from the inductive head; as a result, a temperature in the inductive head becomes very high.

When the temperature in the inductive head becomes high, a portion where the inductive head is formed is more likely to protrude from the opposing surface opposed to a recording medium than the other portion due to a difference in thermal expansion coefficients between the coil layer and the core layers, both composed of a metal material, and an insulating material covering the peripheries thereof.

In particular, in the thin-film magnetic head in which a high recording density is achieved, since a recording current supplied to the toroidal coil has a high frequency, a temperature in the inductive head rises suddenly, thereby resulting in an increased amount of protrusion of the inductive head from the opposing surface opposed to the recording medium. Thus, when the inductive head protrudes from the opposing surface opposed to the recording medium as described above, the inductive head is likely to more often come into collision with the recording medium, whereby the recording medium and the inductive head are likely to be damaged.

The foregoing problem cannot be solved even with the structure of the inductive head set forth in Patent Document 1. Patent Document 1 describes connection between lower and upper stripe-shaped conductive films constituting the toroidal coil, having a structure in which an electrically bonding portion between the lower and upper stripe-shaped conductive films is made wider than other portions of the same, overlapping with a magnetic core.

When FIG. 1 and other figures shown in Patent Document 1 are viewed, the upper stripe-shaped conductive film has a very narrow portion overlapping with another magnetic core, both ends of the upper stripe-shaped conductive film are bent toward a direction (this direction is generally called a height direction) along which the foregoing both ends are distanced away from a base-plate end surface, and the bent portions are made gradually wider. The base ends of the foregoing both ends constitute "an upper lead wire" and "a terminal" mentioned in this disclosure.

Heat generated in the inductive head is easily transferred in the coil layer composed of a thermally conductive metal such as copper (Cu). However, with the structure set forth in Patent Document 1, the portion of the coil layer overlapping with the magnetic core is very narrow, thereby resulting in a very low efficiency of thermal conductance in this portion. Also, in Patent Document 1, although both ends of the coil layer are wider than the portion of the same overlapping with the magnetic core, thermal transfer paths extending to wide both ends are too narrow because of the very narrow portion overlapping with the magnetic core, whereby heat is unlikely to be released to both ends.

Hence, with the structure of the toroidal coil in Patent Document 1 as described above, heat generated in the inductive head is unlikely to be effectively released outside; as a result, it is believed that, since a temperature in the inductive head becomes high, it is difficult to effectively reduce an amount of protrusion of the toroidal coil from the opposing surface opposed to the recording medium.

SUMMARY OF THE INVENTION

Embodiments of the present invention provide a thin-film magnetic head having an excellent heat-dissipation characteristic by optimizing the structure of a toroidal coil layer.

A thin-film magnetic head according to the present invention includes a lower core layer formed so as to extend from an opposing surface of the thin-film magnetic head opposed to a recording medium in the height direction; and a magnetic layer extending above and away from the lower core layer by a predetermined distance and directly or indirectly connected to the lower core layer on the rear side in the height direction. By electrically connecting the ends, in the track-width direction, of each of a plurality of first coil pieces formed below the magnetic layer and the corresponding one of a plurality of second coil pieces formed above the magnetic layer, a toroidal coil layer having the first and second coil pieces wound around the magnetic layer is formed, and a lead layer for supplying a recording current to the toroidal coil layer is connected to the toroidal coil layer. Also, at least one of the rearmost first and second coil pieces lying remotest from the opposing surface in the height direction has a larger width in the width direction and a larger area than those of the corresponding other coil pieces lying forward thereof.

According to the above-described present invention, at least one of the rearmost first and second coil pieces constituting the toroidal coil layer is formed so as to have a larger width in the width direction and a larger area than those of the corresponding other coil pieces lying forward thereof, whereby heat generated in the thin-film magnetic recording head is effectively transferred to the corresponding rearmost first or second coil piece. That is, since the rearmost coil piece has a larger heat capacity than that of the other coil pieces lying forward thereof, the heat is easily transferred to the rearmost coil piece having a large heat capacity; as a result, the temperature of the thin-film magnetic head can be prevented from rising, whereby an amount of thermal expansion of the thin-film magnetic head can be further reduced than is possible today.

According to the present invention, the rearmost coil piece is formed so as to have not only a larger area but also a large width in the track-width direction than those of the other coil pieces lying forward thereof, heat generated in the thin-film magnetic recording head is likely to be effectively transferred to the rearmost coil piece.

Also, according to the present invention, without additionally providing a dissipating member, the above-mentioned heat dissipation can be satisfactorily maintained only by optimizing the structure of the existing members such that at least one of the rearmost first and second coil pieces is formed so as to have a larger width in the track-width direction and a larger area than those of the other coil pieces lying forward thereof.

Although a thin-film magnetic head equipped with a toroidal coil layer can be more effectively miniaturized than that formed by winding a coil in a spiral manner, even when such miniaturization is further advanced, with the structure of the toroidal coil layer according to the present invention, a thin-film magnetic head having a reduced amount of thermal expansion and appropriately coping with requirements for a high recording density and a higher frequency can be fabricated.

Also, the present invention provides a structure in which the rearmost coil piece has two connecting portions; one with one of the other coil pieces, opposed thereto in the film-thickness direction, and one with the lead layer, and in which these connecting portions are formed close to the opposing surface.

Since a recording current passes through the shortest path, it flows between the two connecting portions formed in the rearmost coil piece. The two connecting portions are formed in the rearmost coil piece so as to lie close to the opposing surface. Accordingly, Joule heat is likely to be generated in a portion of the rearmost coil piece, extending close to the opposing surface. The above-mentioned structure in which the connecting portions formed in the rearmost coil piece are disposed close to the opposing surface allows the rearmost coil piece to extend further from the connecting portions to the right side in the height direction so as to have a vast area. Thus, since the heat is mainly generated in the front region of the thin-film magnetic head where the core and the magnetic layer are formed, a thermal transfer path along which the heat is guided (released) to the rear region of the same is easily formed.

Also, according to the present invention, the front end surface of the rearmost coil piece lying close to the opposing surface may interlink with the magnetic layer in the film-thickness direction. This structure increases flux coupling coupled with the magnetic layer, thereby increasing a magnetic field needed for magnetic recording.

Also, the rearmost coil piece is preferably formed so as to have a rear end formed at a further extended position in the height direction than that of the magnetic layer. Although heat generated in the thin-film magnetic recording head is transferred in the rearmost coil piece having a large heat capacity toward the rear side in the height direction, since the rear end of the rearmost coil piece lies at a further extended position in the height direction than that of the magnetic layer, the heat is easily released backward of the magnetic layer in the height direction.

With this structure, it is preferable that a first metal layer be formed backward of the lower core layer in the height direction, integrally with or separately from the lower core layer, and that at least a part of the first metal layer overlap with the rearmost coil piece in the film-thickness direction.

With such a structure, a path toward a base plate (slider) for transferring heat generated in the thin-film magnetic recording head from the rearmost coil piece to the first metal layer is formed, whereby the heat is easily released toward the base plate (slider) constituting the thin-film magnetic head.

Also, the thin film magnetic head may have a structure in which a playback head having an upper shielding layer, a lower shielding layer and a magnetoresistive element disposed between the upper and lower shielding layers is disposed below the lower core layer, a second metal layer is formed backward of the upper shielding layer in the height direction, integrally with or separately from the upper shielding layer, and at least a part of the second metal layer overlaps with the rearmost coil piece in the film-thickness direction, or may have another structure in which a third metal layer is formed backward of the lower shielding layer in the height direction, integrally with or separately from the lower shielding layer, and at least a part of the third metal layer overlaps with the rearmost coil piece in the film-thickness direction.

With the above-mentioned structure, heat generated in the thin-film magnetic recording head is easily released toward the base plate (slider) constituting the thin-film magnetic head.

Also, according to the present invention, a laminate formed by a lower magnetic pole layer, a gap layer, and an upper magnetic pole layer serving as the magnetic layer is preferably provided above the lower core layer from the below in that order so that a track width Tw is defined by the width of the laminate, extending along the opposing surface in the track-width direction.

According to the present invention, a portion close to the opposing surface opposed to the recording medium, of the laminate having the lower magnetic pole layer, the gap layer, and the upper magnetic pole layer is connected to the lower core layer on the front and rear sides in the height direction, so that the laminate is formed above the first coil pieces so as to have a flat shape.

Alternatively, the present invention may provide a structure in which at least a lower magnetic pole layer, a gap layer composed of a nonmagnetic material, and an upper magnetic pole layer are formed by plating above the lower core layer from the below in that order, a magnetic-pole end layer defining a track width Tw by the width, in the track-width direction, of the end surface thereof close to the opposing surface opposed to the recording medium is disposed, and the magnetic layer is laminated on the magnetic-pole end layer.

According to the present invention, the magnetic-pole end layer is formed on the end of the lower core layer close to the opposing surface opposed to the recording medium, and the magnetic layer serves as an upper core layer for connecting a portion of the lower core layer on the rear side in the height direction and the magnetic-pole end layer. The first coil pieces and the second coil pieces are wound around the magnetic layer serving as the upper core layer.

According to the present invention having a structure in which the magnetic layer serves as the upper core layer, the magnetic layer preferably has a lower saturation flux density than that of the upper magnetic pole layer in order to prevent magnetic recording from being conducted outside the recording track width.

Meanwhile, according to the present invention, in order to reduce heat generation of the toroidal coil layer, it is preferable that the length of each second coil piece in a first direction perpendicular to the direction along which a current of the second coil piece flows is greater than that of each first coil piece in the first direction, and that the film thickness of the second coil pieces is greater than that of the first coil pieces.

In the thin-film magnetic head according to the present invention as described in detail above, at least one of the rearmost first and second coil pieces is formed so as to have a larger width in the track-width direction and a larger area than those of the corresponding other coil pieces lying forward thereof, whereby heat generated in the thin-film magnetic head can be effectively released to the rearmost coil piece. Thus, a temperature rise in the thin-film magnetic recording head can be further reduced than is possible today, thereby preventing the thin-film magnetic head from protrusion due to its thermal expansion.

DESCRIPTION OF THE PREFERRED EMBODIMENTS

Figure 1:
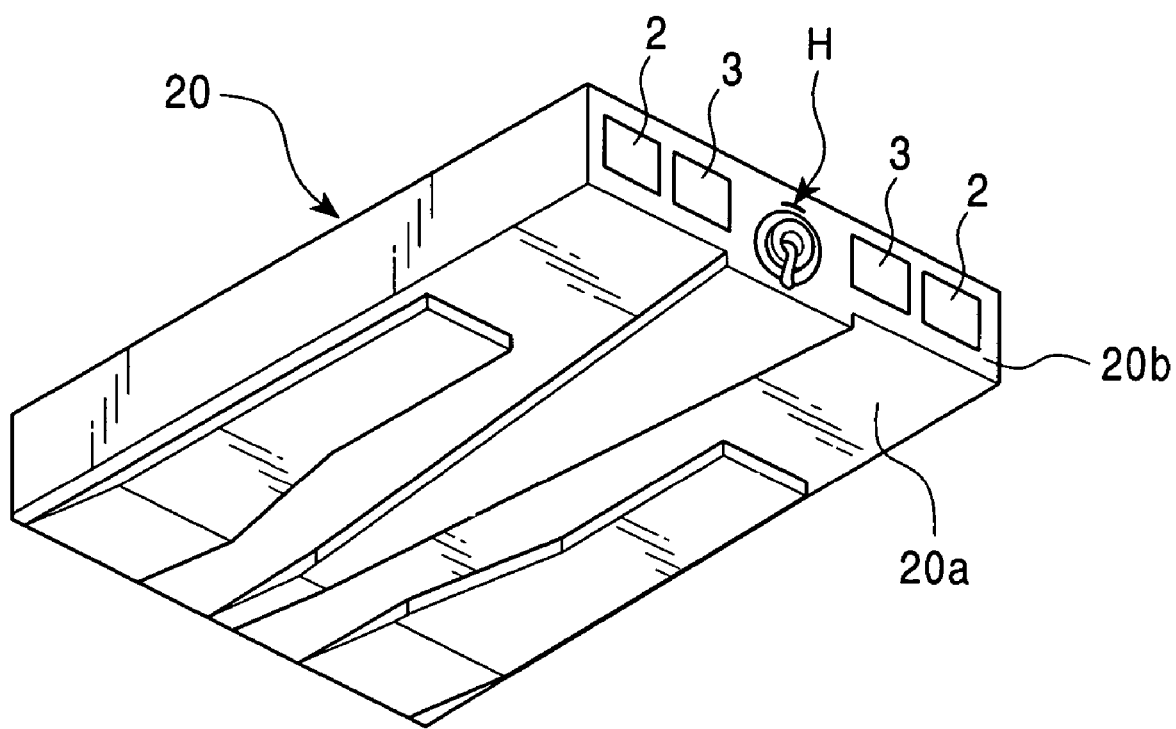
FIG. 1 is a general perspective view of a slider having a thin-film magnetic head according to the present invention formed thereon.
Figure 2:
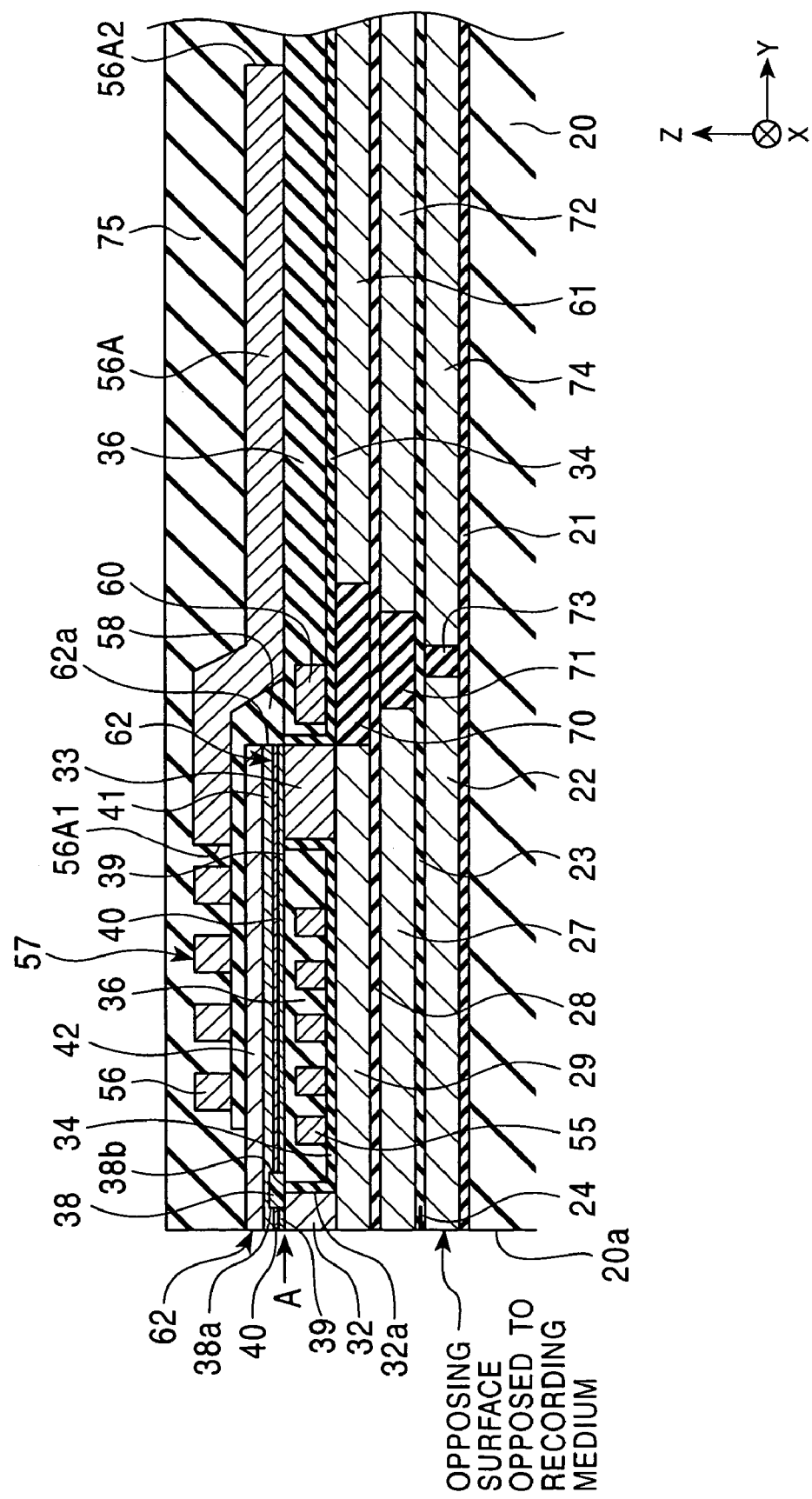
FIG. 2 is a longitudinal sectional view illustrating the structure of a thin-film magnetic head according to a first embodiment of the present invention.
Figure 3:
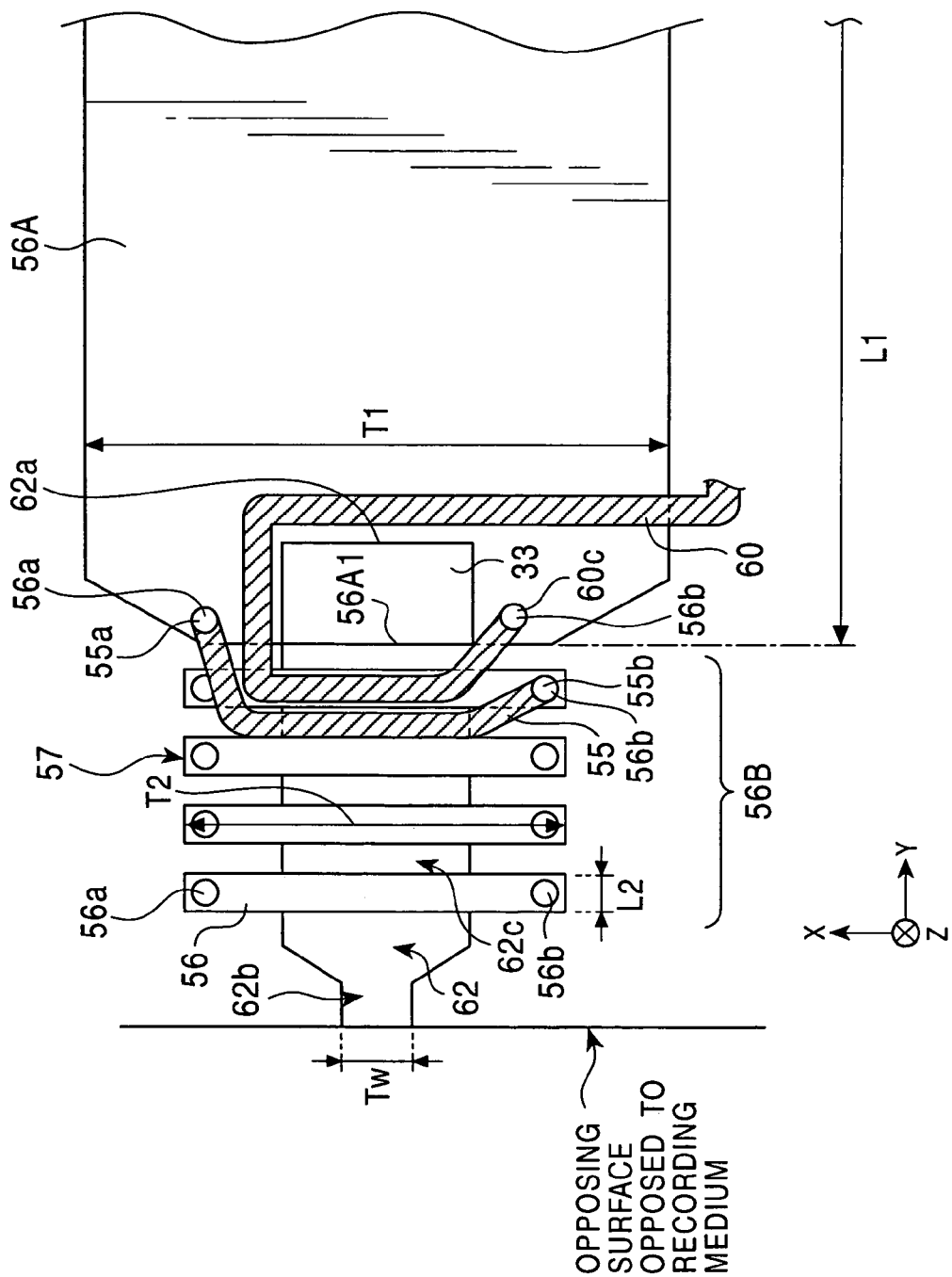
FIG. 3 is a partial plan view of the thin-film magnetic head shown in FIG. 1.

FIG. 1 is a general perspective view of a magnetic head apparatus having a thin-film magnetic head according to the present invention placed on a slider, FIG. 2 is a longitudinal sectional view in part illustrating the structure of a thin-film magnetic head according to a first embodiment of the present invention, and FIG. 3 is a partial plan view of the thin-film magnetic head shown in FIG. 2.

In the meantime, in the following description, the X-direction indicated in the figure is called a track-width direction, and the Y-direction indicated in the figure is called a height direction. Also, the Z-direction indicated in the figure represents a traveling direction of a recording medium (magnetic disk). In addition, the front end surface (leftmost surface shown in FIG. 2) of the thin-film magnetic head is called an "opposing surface opposed to a recording medium". Furthermore, the "front end surface (front end)" of each layer means a surface on the left side in FIG. 2, and the "rear end surface (rear end)" represents a surface on the right side in FIG. 2.

Although the thin-film magnetic head, which will be illustrated with reference to the drawings, is a combination of a recording head (also, called an inductive head) and a playback head (also, called an MR (magnetoresistive) head), it may be formed only by the recording head.

A slider 20 is composed of an alumina titanium carbide ($Al_2O_3$—TiC) or the like, and its opposing surface 20a is opposed to a recording medium. As shown in FIG. 1, the slider 20 has a thin-film magnetic head H and two pairs of terminals 2 and 3 formed on an end 20b extending on the trailing side thereof. The inductive head constituting the thin-film magnetic head H has a toroidal coil layer 57 connected to the pair of terminals 2 having a lead layer interposed therebetween. When a magnetoresistive element of the MR head is provided, a detecting current is supplied from the pair of terminals 3 to the magnetoresistive element, and also a playback magnetic signal is obtained from the pair of terminals 3.

As shown in FIG. 2, the slider 20 has an alumina ($Al_2O_3$) layer 21 formed thereon.

The $Al_2O_3$ layer 21 has a lower shielding layer 22 formed thereon, composed of a NiFe-base alloy, a sendust, or the like, and the lower shielding layer 22 has a gap layer 23 formed thereon, composed of $Al_2O_3$ or the like and formed by a lower gap layer and an upper gap layer.

The gap layer 23 has a magnetoresistive element 24 formed therein, represented by a giant magnetoresistive (GMR) element such as a spin-valve thin-film element, and the front end surface of the mognetoresistive element 24 is exposed from the opposing surface opposed to the recording medium.

The gap layer 23 has an upper shielding layer 27 formed thereon, composed of a NiFe-base alloy or the like.

A portion extending from the lower shielding layer 22 to the upper shielding layer 27 is called a playback head (also, called an MR head).

As shown in FIG. 2, the upper shielding layer 27 has a separating layer 28 formed thereon, composed of $Al_2O_3$ or the like. Meanwhile, the upper gap layer may have a lower core layer 29 disposed thereon, which will be described below, without providing the upper shielding layer 27 and the separating layer 28. In such a case, the lower core layer 29 also serves as an upper shielding layer.

In the configuration shown in FIG. 2, the separating layer 28 has the lower core layer 29 formed thereon. The lower core layer 29 is composed of a magnetic material such as a NiFe-base alloy. The lower core layer 29 is formed so as to have a predetermined length in the height direction from the opposing surface opposed to the recording medium (in the Y-direction indicated in the figure).

The lower core layer 29 has a raised layer formed thereon so as to have a predetermined length from the opposing surface opposed to the recording medium in the height direction (in the Y-direction indicated in the figure). In addition, the raised layer 32 has a back gap layer 33 formed so as to lie away from a rear end surface 32a thereof in the height direction (in the Y-direction indicated in the figure) by a predetermined distance.

The raised layer 32 and the back gap layer 33 are composed of a magnetic material, and these layers may be composed of the same material as or a different material from that of the lower core layer 29. Also, the raised layer 32 and the back gap layer 33 may be formed of a single-layered or multi-layered laminated structure. The raised layer 32 and the back gap layer 33 are magnetically connected to the lower core layer 29.

As shown in FIG. 2, the raised layer 32 and the back gap layer 33 has a coil-insulating underlying layer 34 formed therebetween and on the lower core layer 29, and the coil-insulating underlying layer 34 has a plurality of first coil pieces 55 formed thereon.

The first coil pieces 55 has a coil insulating layer 36 filled in the above space thereof, composed of an inorganic insulating material such as $Al_2O_3$. As shown in FIG. 2, the upper surfaces of the raised layer 32, the coil insulating layer 36, and the back gap layer 33 form a continuous planarized surface extending along the reference surface A shown in FIG. 2.

As shown in FIG. 2, the raised layer 32 and the coil insulating layer 36 have a gap depth (Gd) defining layer 38 formed on the planarized surface so as to extend from a position away from the opposing surface opposed to the recording medium by a predetermined distance in the height direction (in the Y-direction indicated in the figure).

Also, as shown in FIG. 2, formed on the raised layer 32 from the opposing surface opposed to the recording medium to a front end surface 38a of the Gd defining layer 38, on the coil insulating layer 36 from a rear end surface 38b of the Gd defining layer 38 in the height direction, and on the back gap layer 33 are a lower magnetic pole layer 39 and a gap layer 40 from the below in that order. The lower magnetic pole layer 39 and the gap layer 40 are formed by plating. Meanwhile, the length of the gap layer 40 in the height direction is defined by the Gd defining layer 38.

Also, as shown in FIG. 2, the gap layer 40 and the Gd defining layer 38 have an upper magnetic pole layer 41 formed thereon by plating, serving as a magnetic layer of the present invention, and also the upper magnetic pole layer 41 has an upper core layer 42 formed thereon by plating. The upper magnetic pole layer 41 is directly or indirectly connected to the lower core layer 29, having the back gap layer 33 interposed therebetween. The lower magnetic pole layer 39, the gap layer 40, and the upper magnetic pole layer 41 form a laminate of the present invention.

In this embodiment, the four layers of the lower magnetic pole layer 39, the gap layer 40, the upper magnetic pole layer 41, and the upper core layer 42 form a laminate 62. When viewed from right above, the laminate 62 has an example structure as shown in FIG. 3. The laminate 62 has a front end region 62b lying close to the opposing surface opposed to the recording medium, formed so as to have a small width in the track-width direction (in the X-direction indicated in the figure), and a track width Tw is defined by the width in the track-width direction, of the surface of the front end region 62b opposed to the recording medium. The track width Tw is, for example, not greater than 0.7 μm and is preferably not greater than 0.5 μm. Also, the laminate 62 has a rear end region 62c, whose width in the track-width direction is formed so as to become wider from the base end of the front end region 62b in the height direction (in the Y-direction indicated in the figure), and the area of the rear end region 62c is made substantially larger than that of the front end region 62b.

As shown in FIG. 2, the upper core layer 42 has an insulating layer 58 formed thereon, composed of an insulating material such as $Al_2O_3$. The insulating layer 58 is preferably composed of an inorganic insulating material.

As shown in FIG. 2, the insulating layer 58 has a plurality of second coil pieces 56 formed thereon.

The ends of each first coil piece 55 and the corresponding second coil piece 56, lying in the track-width direction, are electrically connected to each other, and the toroidal coil layer 57 having the first and second coil pieces 55 and 56 wound around the laminate 62 is formed.

The toroidal coil layer 57 has a protecting layer 75 formed thereon, composed of an insulating material such as $Al_2O_3$ or AlSiO.

Characteristic parts of the thin-film magnetic head shown in FIGS. 2 and 3 will be described below.

In the thin-film magnetic head shown in FIG. 2, the toroidal coil layer 57 having the pluralities of first and second coil pieces 55 and 56 wound around the laminate 62 is formed. FIG. 3 is a partial plan view of the thin-film magnetic head shown in FIG. 2, which illustrates only the laminate 62, the first coil pieces 55, the second coil pieces 56, and a lead layer 60. In the meantime, only a part of the first coil pieces 55 is illustrated in the figure, and the remaining is omitted.

As shown in FIG. 3, each second coil piece 56 has connecting portions 56a and 56b at both ends thereof in the track-width direction (in the X-direction indicated in the figure), and also, each first coil piece 55 has connecting portions 55a and 55b at both ends thereof in the track-width direction. The one connecting portion 55a of the first coil piece 55 is electrically connected to the one connecting portion (end) 56a of the second coil piece 56, directly or having an independent connecting layer (not shown) interposed therebetween, both portions opposed to each other in the film-thickness direction thereof (in the Z-direction indicated in the figure), and the other connecting portion (end) 55b of the first coil pieces 55 is electrically connected, directly or having an independent connecting layer (not shown) interposed therebetween, to the other connecting portion (end) 56b of the other second coil piece 56 lying immediately in front of (closer to the opposing surface opposed to the recording medium than) the above-mentioned second coil piece 56 connected to the above-mentioned connecting portion 55a. When each first coil piece 55 and the corresponding second coil piece 56 are connected in a zigzag manner as mentioned above, these coil pieces are wound around the laminate 62 so as to form the toroidal coil layer 57.

As shown in FIG. 3, of the second coil pieces 56, a rearmost second coil piece 56A lying remotest from the opposing surface opposed to the recording medium (that is, lying remotest in the height direction (in the Y-direction indicated in the figure)) has a larger area than that of a plurality of the other second coil pieces 56 (hereinafter, the plurality of other second coil pieces 56 are called "other second coil pieces 56B") formed forward thereof, i.e., closer to the opposing surface.

The rearmost second coil piece 56A has a width T1 in the track-width direction (in the X-direction indicated in the figure) greater than a width T2 of the other second coil pieces 56B in the track-width direction. Meanwhile, the "track width" mentioned here means the maximum one of the track widths.

In addition, the rearmost second coil piece 56A has a length L1 in the height direction (in the Y-direction indicated in the figure) greater than a length L2 of the other second coil pieces 56B in the height direction. Meanwhile, the "length in the height direction" mentioned here means the maximum one of the lengths.

As shown in FIGS. 2 and 3, the rearmost second coil piece 56A has a rear end 56A2 formed at a further extended position in the height direction (in the Y-direction indicated in the figure) than a rear end 62a of the laminate 62, and the rearmost second coil piece 56A overlies the rear region of the laminate 62.

In this embodiment, the rearmost second coil piece 56A is able to function as a heat transfer layer for releasing Joule heat generated in the toroidal coil layer 57 backward thereof in the height direction. Also, in the thin-film magnetic recording head, heat due to eddy currents is generated in the lower core layer 29, the laminate 62, the raised layer 32, and the back gap layer 33, and this heat is transferred to the rearmost second coil piece 56A.

As mentioned above, the rearmost second coil piece 56A has a larger width in the track-width direction than that of the other second coil pieces 56B; accordingly, Joule heat and the like from the toroidal coil layer 57 are easily transferred to the wide rearmost second coil piece 56A. Also, since the rearmost second coil piece 56A has a larger width in the track-width direction than that of the other second coil pieces 56B, it has a larger heat capacity than the other second coil pieces 56B, whereby the Joule heat and the like emitted from the toroidal coil layer 57 are easily released to the rearmost second coil piece 56A.

In addition, as shown in FIGS. 2 and 3, the rear end 56A2 of the rearmost second coil piece 56A is formed at a further extended position in the height direction than the rear end 62a of the laminate 62, whereby heat is easily released toward the rear region of the laminate 62.

Although the rearmost second coil piece 56A may have any flat shape, desirably it completely covers a portion of the laminate 62 from the above, opposed thereto in the film-thickness direction from a front end surface 56A1 of the second coil piece 56A to backward of the same in the height direction, and also extends outside both sides of the laminate 62 in the track-width direction and in the rear region extending immediately backward of the laminate 62. In the meantime, in this state, preferably no second coil piece 56A is formed right below each of the terminals 2 and 3 shown in FIG. 1 in order to allow the terminals 2 and 3 to be easily connected to a lead layer connected to the toroidal coil layer 57 and another lead layer connected to the mognetoresistive element 24, respectively.

As shown in FIG. 3, the rearmost second coil piece 56A has the two connecting portions 56a and 56b. Of these connecting portions, the one connecting portion 56a is electrically connected to the one connecting portion 55a of the first coil piece 55, directly or having an independent connecting layer (not shown) therebetween, both portions opposed to each other in the film-thickness direction thereof (in the Z-direction indicated in the figure). Also, the other connecting portion 56b is electrically connected to a connecting portion 60c of the lead layer 60, both connecting portions opposed to each other in the film-thickness direction thereof, directly or having an independent connecting portion therebetween. The lead layer 60 extends substantially half around the back gap layer 33 and outward the rearmost second coil piece 56A. Thus, the base end (not shown) of the lead layer 60 is connected to one of the terminals 2. Although not shown in FIG. 3, since a lead layer is also opposed to the end 56a of the foremost second coil piece 56 from below, the lead layer and the end 56a of the second coil piece 56 are electrically connected to each other, and the base end of the lead layer is connected to the other terminal 2.

For example, the first coil pieces 55 and the lead layer 60 are formed in the same step and on the common coil-insulating underlying layer 34.

The rearmost second coil piece 56A has the two connecting portions 56a and 56b as described above, and, also in the rearmost second coil piece 56A as in the same fashion as in the other second coil pieces 56B, a recording current flows between the connecting portions 56a and 56b; thus, the rearmost second coil piece 56A also serves so as to generate flux coupling with the laminate 62.

As described above, the rearmost second coil piece 56A has a structure in which the rear end 56A2 thereof in the height direction lies at a further extended position in the height direction than the rear end 62a of the laminate 62, whereby the two connecting portions 56a and 56b of the rearmost second coil piece 56A can be formed so as to lie close to the opposing surface opposed to the recording medium.

Since a recording current passes through the shortest path, in the rearmost second coil piece 56A, it flows between the two connecting portions 56a and 56b. By forming the two connecting portions 56a and 56b so as to lie as close to the opposing surface opposed to the recording medium as possible, the second coil piece 56A in which substantially no recording current flows and accordingly no Joule heat is generated can be formed backward of the connecting portions 56a and 56b in the height direction so as to have a vast area, whereby the second coil piece 56A extending backward of the connecting portions 56a and 56b is able to serve as a genuine heat-dissipating region.

Also, as shown in FIGS. 2 and 3, the front end surface 56A1 of the rearmost second coil piece 56A lying close to the opposing surface opposed to the recording medium interlinks with the laminate 62 in the film-thickness direction (in the Z-direction indicated in the figure), resulting in a preferable structure for increasing flux coupling. Also, in this state, the two connecting portions 56a and 56b formed in the rearmost second coil piece 56A are disposed outside both sides of the laminate 62 in the track-width direction.

Similar to the other second coil pieces 56B, the rearmost second coil piece 56A is composed of at least one nonmagnetic metal material selected from, for example, Au, Ag, Pt, Cu, Cr, Al, Ti, Sn, NiP, Mo, W, Pd, Rh, and Ni. Alternatively, it may have a laminated structure in which some of these nonmagnetic metal materials are laminated. The rearmost second coil piece 56A has a higher thermal conductivity than an insulating layer such as the protecting layer 75 formed thereon or the coil insulating layer 36 formed thereunder. Accordingly, a major part of Joule heat and the like generated from the toroidal coil layer 57 is easily transferred to the rearmost second coil piece 56A, whereby the heat is easily released backward of the laminate 62 in the height direction.

In the embodiment shown in FIG. 2, the heat reached to the rearmost second coil piece 56A is then transferred to a first metal layer 61 formed backward of the lower core layer 29 in the height direction. In the configuration shown in FIG. 2, the lower core layer 29 and the first metal layer 61 are formed independently of each other. The lower core layer 29 and the first metal layer 61 have an insulating layer 70 interposed therebetween. The first metal layer 61 is formed on the separating layer 28 in the same fashion as the lower core layer 29 is formed. For example, the first metal layer 61 and the lower core layer 29 are formed in the same step. In such a case, the first metal layer 61 and the lower core layer 29 are composed of the same magnetic material such as permalloy. Alternatively, the first metal layer 61 and the lower core layer 29 may be formed in respectively independent steps. In such a case, the first metal layer 61 may be composed of the same material as or a different material from that of the lower core layer 29. When composed of a different material, the first metal layer 61 is preferably composed of a nonmagnetic metal material such as copper in the same fashion as the rearmost second coil piece 56A.

The first metal layer 61 is disposed so as to be opposed to the rearmost second coil piece 56A in the film-thickness direction (in the Z-direction indicated in the figure). The area of the first metal layer 61 may be the same as or different from that of the rearmost second coil piece 56A when viewed in the film-thickness direction in which these two are opposed to each other.

As shown in FIG. 2, while the second coil pieces 56 and the laminate 62 have the insulating layer 58 interposed therebetween, the insulating layer 58 has a portion extending backward of the laminate 62, which covers almost only the rear end 62a of the laminate 62. The rearmost second coil piece 56A extending backward of the laminate 62 in the height direction is bent downward from the above of the insulating layer 58 and extends on the coil insulating layer 36, and, in the region where no insulating layer 58 is disposed, the rearmost second coil piece 56A and the first metal layer 61 have a reduced distance therebetween. Thus, heat is effectively transferred from the rearmost second coil piece 56A to the first metal layer 61.

Also, in the embodiment shown in FIG. 2, the upper shielding layer 27 has a second metal layer 72 having an insulating layer 71 interposed therebetween, formed separately therefrom and backward thereof in the height direction. The second metal layer 72 may be composed of the same material as or a different material from that of the upper shielding layer 27. When composed of a different material, the second metal layer 72 is preferably composed of a nonmagnetic metal material such as copper in the same fashion as the rearmost second coil piece 56A.

The second metal layer 72 is formed on the gap layer 23 in the same fashion as the upper shielding layer 27 is formed.

In addition, in the embodiment shown in FIG. 2, the lower shielding layer 22 has a third metal layer 74 having an insulating layer 73 interposed therebetween, formed separately therefrom and backward thereof in the height direction. The third metal layer 74 may be composed of the same material as or a different material from that of the lower shielding layer 22. When composed of a different material, the third metal layer is preferably composed of a nonmagnetic metal material such as copper in the same fashion as the rearmost second coil piece 56A.

The third metal layer 74 is formed on the $Al_2O_3$ layer 21 in the same fashion as the lower shielding layer 22 is formed.

The metal layers 72 and 74 respectively formed in the same layers as the upper shielding layer 27 and the lower shielding layer 22 as shown in FIG. 2 extend so as to be opposed to the rearmost second coil piece 56A in the film-thickness direction (in the Z-direction indicated in the figure), and in the configuration shown in FIG. 2, the heat transferred from the rearmost second coil piece 56A to the first metal layer 61 is effectively transferred to the metal layers 72 and 74, whereby the heat is more easily released from the third metal layer 74 to the slider 20.

Also, the first and second metal layers 61 and 72 and/or the second and third metal layers 72 and 74 may be connected by a thermal conductive layer (not shown) formed independently of the corresponding metal layers. With this structure, the heat can be more effectively released toward the slider 20. The thermal conductive layer is preferably composed of a metal material having a high thermal conductivity, in particular, a nonmagnetic metal material such as copper in the same fashion as the rearmost second coil piece 56A.

Also, in the embodiment shown in FIG. 2, the areas of the first metal layer 61, the second metal layer 72, and the third metal layer 74 become greater in that order. In the configuration shown in FIG. 2, The lengths of the first metal layer 61, the second metal layer 72, and the third metal layer 74 in the height direction (in the Y-direction indicated in the figure) are made greater in that order so as to vary the areas thereof. In other words, the heat capacities of the first metal layer 61, the second metal layer 72, and the third metal layer 74 become greater in that order, whereby the heat can be effectively released from the rearmost second coil piece 56A to the slider 20.

In the meantime, none of the first metal layer 61, the second metal layer 72, and the third metal layer 74 may be disposed, or at least one of these metal layers may be disposed.

Figure 4:
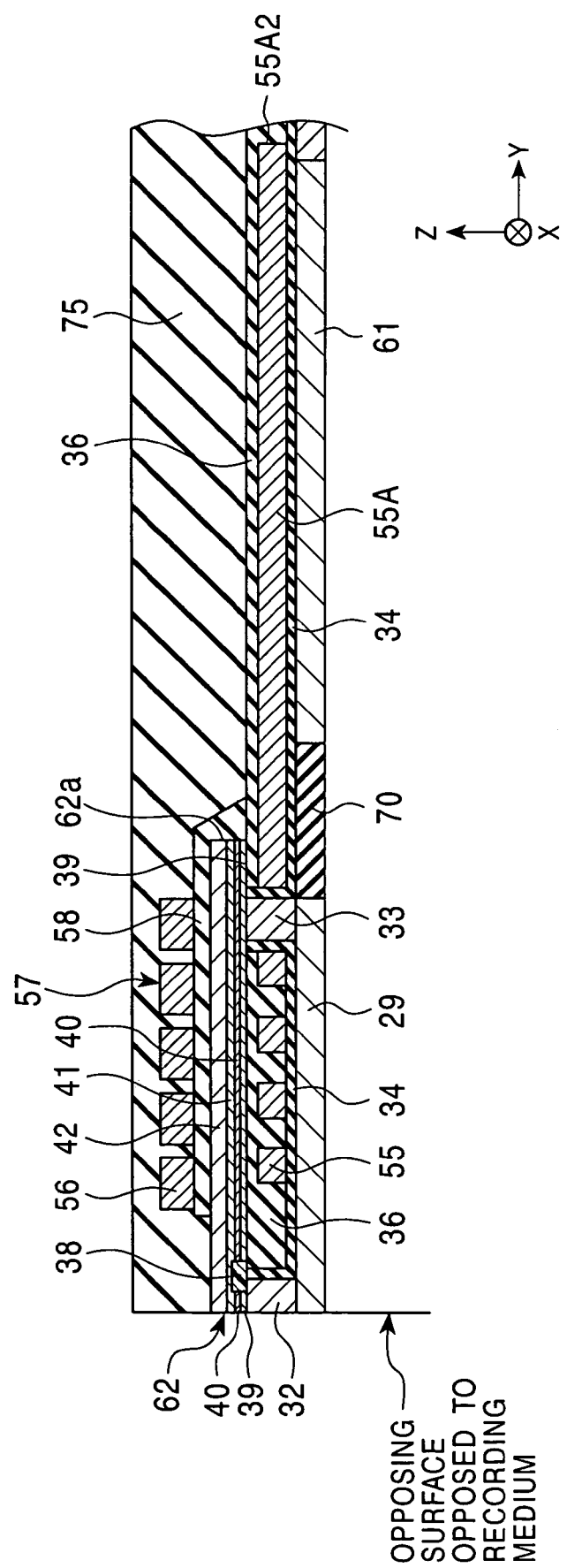
FIG. 4 is a longitudinal sectional view illustrating the structure of a thin-film magnetic head according to a second embodiment of the present invention.
Figure 5:
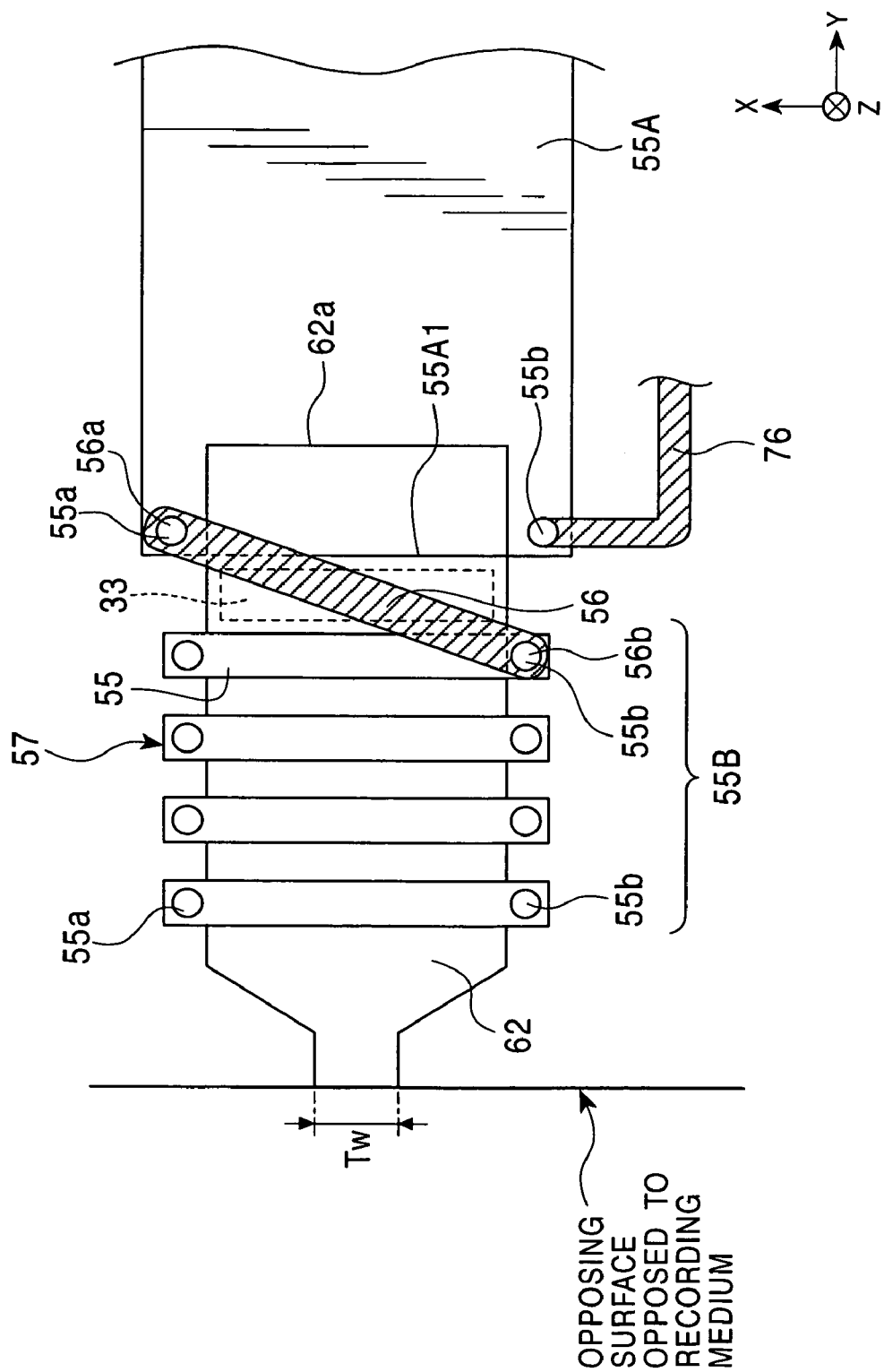
FIG. 5 is a partial plan view of the thin-film magnetic head shown in FIG. 4.

FIG. 4 is a longitudinal sectional view in part illustrating the structure of a thin-film magnetic head according to a second embodiment of the present invention, and FIG. 5 is a partial plan view of the thin-film magnetic head shown in FIG. 4. Layers denoted by the same reference numerals as in FIGS. 2 and 3 represent the same layers as those shown in FIGS. 2 and 3. Although only an inductive head serving as a recording thin-film magnetic head is illustrated in FIG. 4, a playback MR head may be disposed under the inductive head in the same fashion as in FIG. 2.

In the thin-film magnetic head shown in FIG. 4, of the plurality of first coil pieces 55 disposed below the laminate 62, a rearmost first coil piece 55A lying remotest from the opposing surface opposed to a recording medium in the height direction has a larger width in the track-width direction and a larger area than those of a plurality of first coil pieces 55B (hereinafter, these coil pieces are called other first coil pieces 55B) disposed forward thereof.

The rearmost first coil piece 55A has a rear end 55A2 in the height direction, formed at a further extended position in the height direction (in the Y-direction indicated in the figure) than the rear end 62a of the laminate 62 in the height direction, and the rearmost first coil piece 55A underlies the rear region of the laminate 62 in the height direction.

FIG. 5 illustrates all first coil pieces 55, a part of the second coil pieces 56, the laminate 62, and a lead layer 76, all forming the thin-film magnetic head shown in FIG. 4.

As shown in FIG. 5, both ends of each first coil piece 55 in the track-width direction (in the X-direction indicated in the figure) serve as the connecting portions 55a and 55b. Also, both ends of each second coil piece 56 in the rack-width direction serve as the connecting portions 56a and 56b. As shown in FIG. 5, the one connecting portion 55a of the rearmost first coil piece 55A and the one connecting portion 56a of the rearmost second coil piece 56A, both opposed to each other in the film-thickness direction (in the Z-direction indicated in the figure), are connected directly or having an independent connecting layer (not shown) interposed therebetween, and the other connecting portion 56b of the rearmost second coil piece 56A is connected to the end 55b of the first coil piece 55 lying immediately in front of the rearmost first coil piece 55A, directly or having an independent connecting layer (not shown) interposed therebetween. When each first coil piece 55 and the corresponding second coil piece 56 are connected in a zigzag manner as mentioned above, these coil pieces are wound around the laminate 62 so as to form the toroidal coil layer 57.

As shown in FIG. 5, the rearmost first coil piece 55A has the two connecting portions 55a and 55b, and, while the one connecting portion 55a is connected to the end 56a of the rearmost second coil piece 56A as mentioned above, the other connecting portion 55b is connected to the lead layer 76, directly or having an independent connecting layer (not shown) interposed therebetween. The lead layer 76 is formed in the same step and composed of the same material as those of the second coil pieces 56.

The lead layer 76 is formed so as to extend above and from the insulating layer 58 to the coil insulating layer 36, and the base end of the lead layer 76 extends outside the rearmost first coil piece 55A so as to be connected to one of the terminals 2.

As shown in FIGS. 4 and 5, the rear end 62a of the laminate 62 in the height direction is formed at a further extended position in the height direction than the rear end of the back gap layer 33, and the rearmost first coil piece 55A has a front end surface 55A1 interlinking with the laminate 62 in the film-thickness direction (in the Z-direction indicated in the figure).

Also in the thin-film magnetic head shown in FIGS. 4 and 5, in the same fashion as in the thin-film magnetic head shown in FIGS. 2 and 3, the rearmost first coil piece 55A serves as a coil layer for generating flux coupling and also as a heat transfer layer for releasing heat generated in the toroidal coil layer 57 outside.

The rearmost first coil piece 55A has the same configuration and the same working effect as those of the rearmost second coil piece 56A illustrated in FIGS. 2 and 3.

Figure 6:
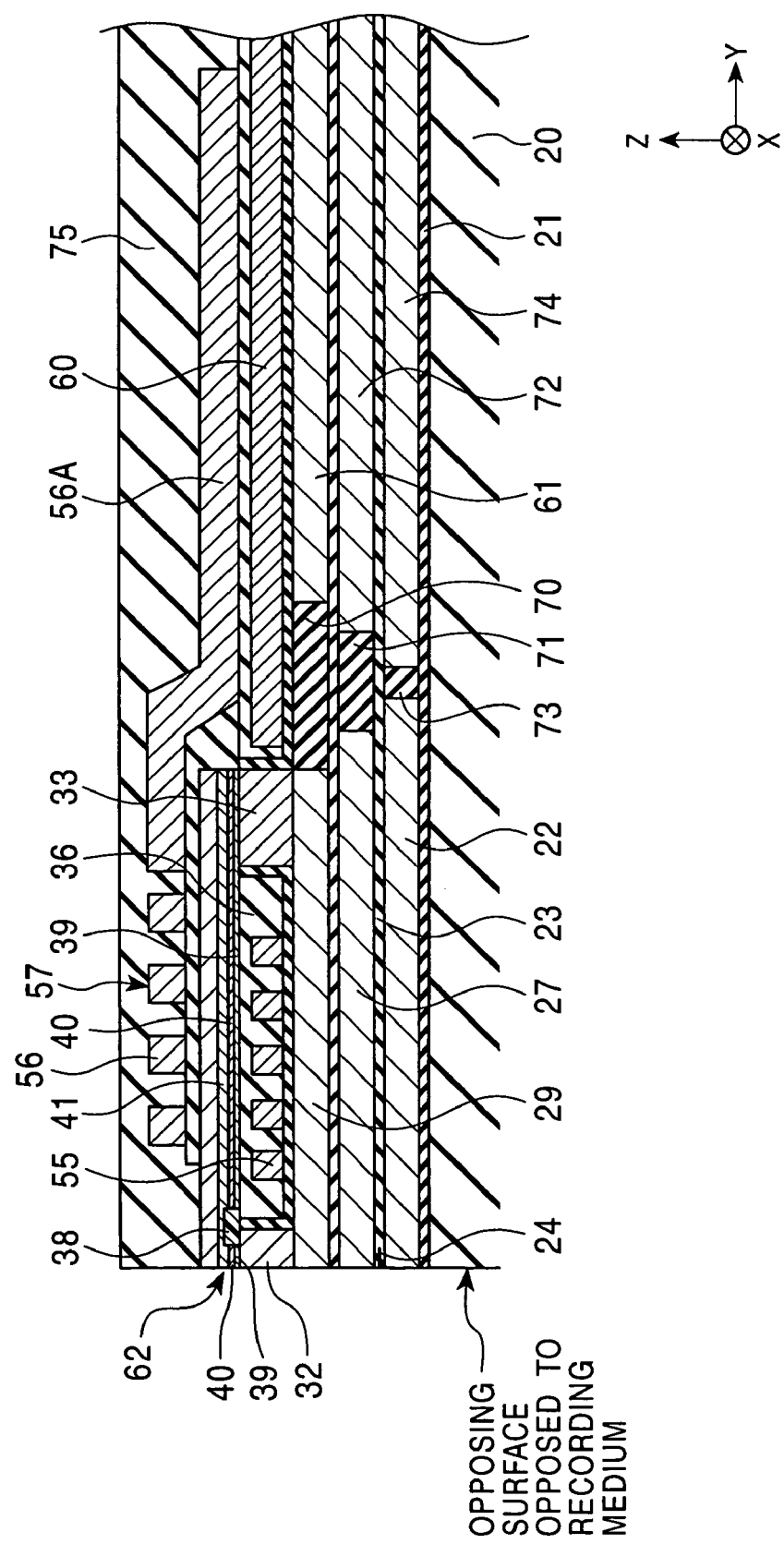
FIG. 6 is a longitudinal sectional view illustrating the structure of a thin-film magnetic head according to a third embodiment of the present invention.
Figure 7:
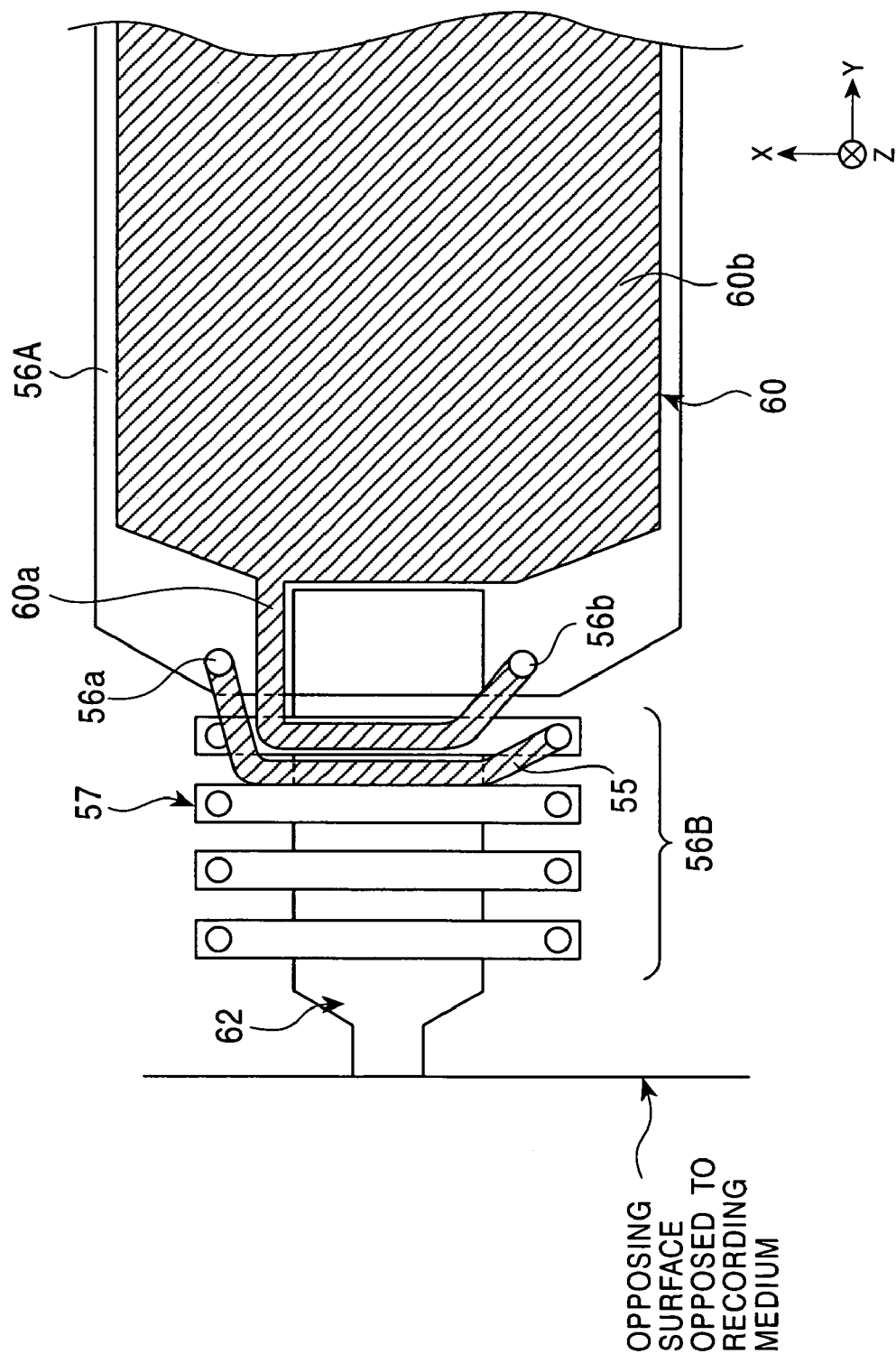
FIG. 7 is a partial plan view of the thin-film magnetic head shown in FIG. 6.

FIG. 6 is a longitudinal sectional view in part illustrating the structure of a thin-film magnetic head according to a third embodiment of the present invention, and FIG. 7 is a partial plan view of the thin-film magnetic head shown in FIG. 6. Layers denoted by the same reference numerals as in FIGS. 2 and 3 represent the same layers as those shown in FIGS. 2 and 3.

In the embodiment shown in FIG. 6, the rearmost second coil piece 56A has a larger width in the track-width direction and a larger area than those of the other second coil pieces 56B, and this configuration is the same as that shown in FIGS. 2 and 3.

In the thin-film magnetic head shown in FIG. 6, as shown in FIG. 7, the lead layer 60 connected to the end 56b of the rearmost second coil piece 56A, directly or having an independent connecting layer (not shown) interposed therebetween, is formed by a lead front-end region 60a having a narrow width and a lead rear-end region 60b formed integrally with the lead front-end region 60a so as to have a larger width in the track-width direction than that of the lead front-end region 60a, and the lead rear-end region 60b is disposed so as to be opposed to the rearmost second coil piece 56A in the film-thickness direction (in the Z-direction indicated in the figure).

The lead layer 60 is preferably formed in the same step as that of the first coil pieces 55 and composed of a nonmagnetic metal material such as copper in the same fashion as the first coil pieces 55.

The lead layer 60 extends further rearward in the height direction so as to lie outside the forming region of the rearmost second coil piece 56A and is connected to one of the terminals 2 formed on the protecting layer 75.

In the configuration shown in FIGS. 6 and 7, by forming the lead rear-end region 60b of the lead layer 60 opposed to the rearmost second coil piece 56A in the film-thickness direction so as to have a larger area than the lead front-end region 60a, heat absorbed in the rearmost second coil piece 56A can be transferred to the first metal layer 61 and the below thereof, thereby more effectively releasing the heat outside.

In the thin-film magnetic head shown in FIGS. 6 and 7, although a part of Joule heat emitted from the toroidal coil layer 57 is directly transferred also to the lead rear-end region 60b of the lead layer 60, the lead front-end region 60a narrower than the lead rear-end region 60b does not substantially work as a heat transfer path, and also, because of being disposed backward of the back gap layer 33, the lead rear-end region 60b lies remotely away from the first coil pieces 55 and so forth. Accordingly, it is expected that the Joule heat generated from the toroidal coil layer 57 is easily transferred to the rearmost second coil piece 56A disposed closer to the first and second coil pieces 55 and 56 and having a large area as a whole. And also, it is expected that the heat is then transferred from the rearmost second coil piece 56A to the lead rear-end region 60b formed thereunder.

Figure 8:
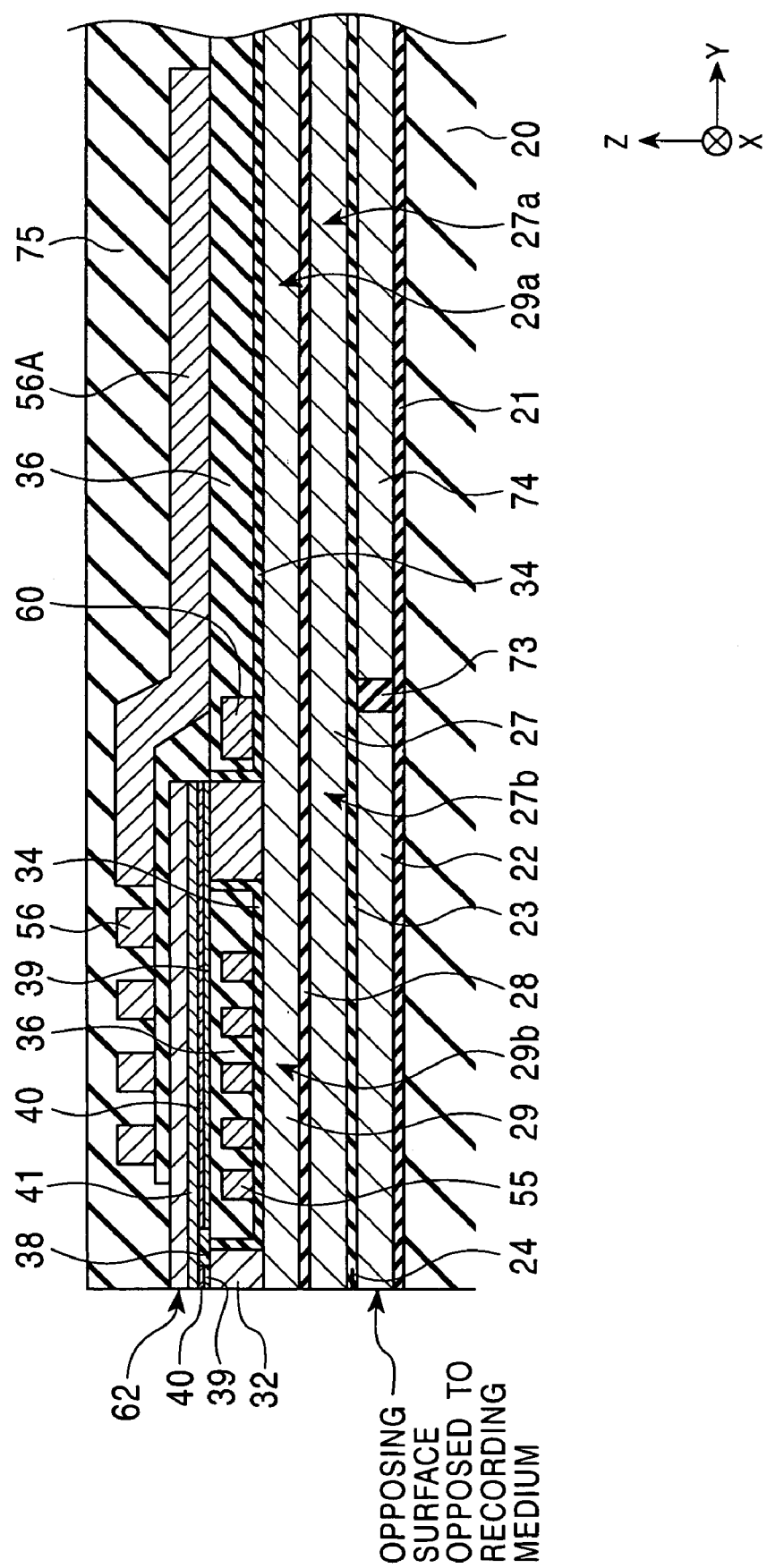
FIG. 8 is a longitudinal sectional view illustrating the structure of a thin-film magnetic head according to a fourth embodiment of the present invention.
Figure 9:
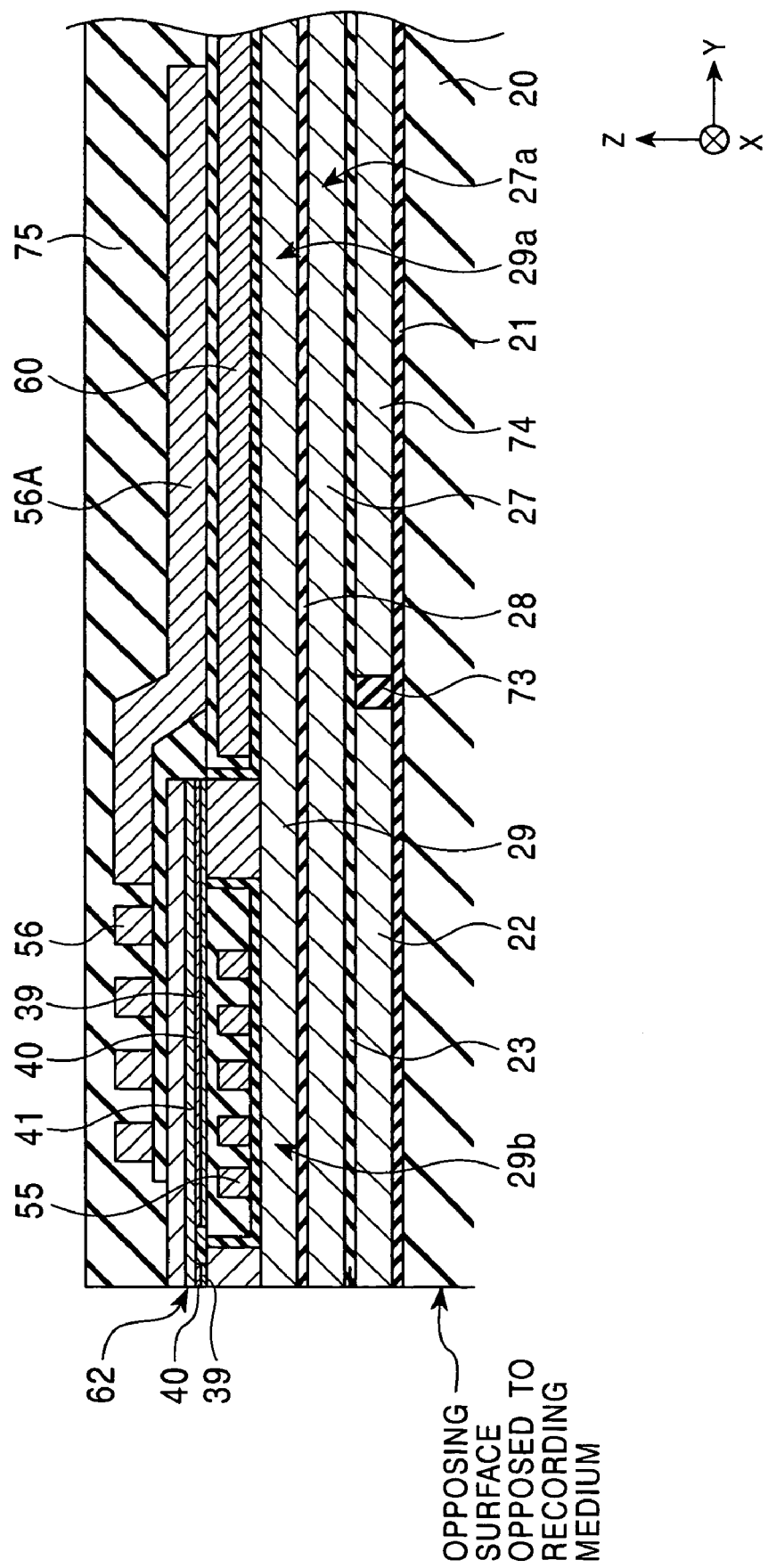
FIG. 9 is a longitudinal sectional view illustrating the structure of a thin-film magnetic head according to a fifth embodiment of the present invention.

FIG. 8 is a longitudinal sectional view in part illustrating the structure of a thin-film magnetic head according to a fourth embodiment of the present invention, and FIG. 9 is a longitudinal sectional view in part illustrating the structure of a thin-film magnetic head according to a fifth embodiment of the present invention. The thin-film magnetic head shown in FIG. 8 has the same structure as that of the inductive head of the thin-film magnetic head shown in FIG. 2, and the thin-film magnetic head shown in FIG. 9 has the same structure as that of the inductive head of the thin-film magnetic head shown in FIG. 6. In the thin-film magnetic heads shown in FIGS. 8 and 9, the lower core layer 29 and the upper shielding layer 27 extend further in the height direction so as to be opposed to the rearmost second coil piece 56A in the thin-film direction. Although, in the configuration shown in FIG. 2, the first metal layer 61 and the second metal layer 72 are separately formed backward of the lower core layer 29 and the upper shielding layer 27 in the height direction, respectively, in the configurations shown in FIGS. 8 and 9, these metal layers are integrally formed with the corresponding lower core layer 29 and upper shielding layer 27 lying forward thereof.

According to the especially preferable configurations shown in FIGS. 8 and 9, the lower core layer 29 and the upper shielding layer 27 respectively have rear regions 29a and 27a opposed to the rearmost second coil piece 56A in the film-thickness direction and also have front regions 29b and 27b opposed to the laminate 62 in the film-thickness direction, and the rear regions 29a and 27a are respectively wider in the track-width direction than the front regions 29b and 27b, whereby the heat capacities of the rear regions 29a and 27a of the corresponding lower core layer 29 and upper shielding layer 27 can be made greater than those of the front regions of the same.

Accordingly, the lower core layer 29 and the upper shielding layer 27 are formed so as to extend further in the height direction than the laminate 62; hence, even when the extended portions thereof are opposed to the rearmost second coil piece 56A in the film-thickness direction, the large heat capacities of the extended portions allow heat from the rearmost second coil piece 56A to be effectively released to the slider 20 without exerting an adverse affect on the mognetoresistive element 24.

In the configurations shown in FIGS. 8 and 9, although the lower shielding layer 22 and the third metal layer 74 are separately formed from each other, they may be integrally formed with each other.

Also, any of the first metal layer 61, the second metal layer 72, and the third metal layer 74 can be arbitrarily selected so as to be integrally formed with the corresponding magnetic layers extending forward thereof.

In addition, in the above-described embodiments, both the rearmost first and second coil pieces 55A and 56A may be formed so as to have larger widths in the track-width direction and larger areas than those of the other coil pieces 55B and 56B, respectively.

In each of the inductive heads according to the present invention as described in detail above, at least one of the rearmost first and second coil pieces 55A and 56A has a larger width in the track-width direction and a larger area than those of the corresponding other coil pieces 55B or 56B extending forward thereof; consequently, heat generated in the inductive head can be effectively released to the corresponding rearmost coil piece. Thus, a temperature rise in the inductive head can be further reduced than is possible today, thereby preventing the inductive head from protrusion due to its thermal expansion.

In particular, according to the present invention, by making the shape of at least one of the rearmost first and second coil pieces 55A and 56A large, Joule heat and the like from the corresponding coil piece lying forward thereof can be effectively transferred to the corresponding rearmost first or second coil piece 55A or 56A lying close to the above coil piece, thereby improving heat dissipation.

Also, according to the present invention, by optimizing the shape of at least one of the rearmost first and second coil pieces 55A and 56A, heat dissipation can be improved without additionally providing a dissipating member or the like. Hence, the thin-film magnetic head having an excellent heat dissipation characteristic can be more easily fabricated, and miniaturization of the thin-film magnetic head so as to meet a future requirement for a high recording density can be promoted.

Figure 10:
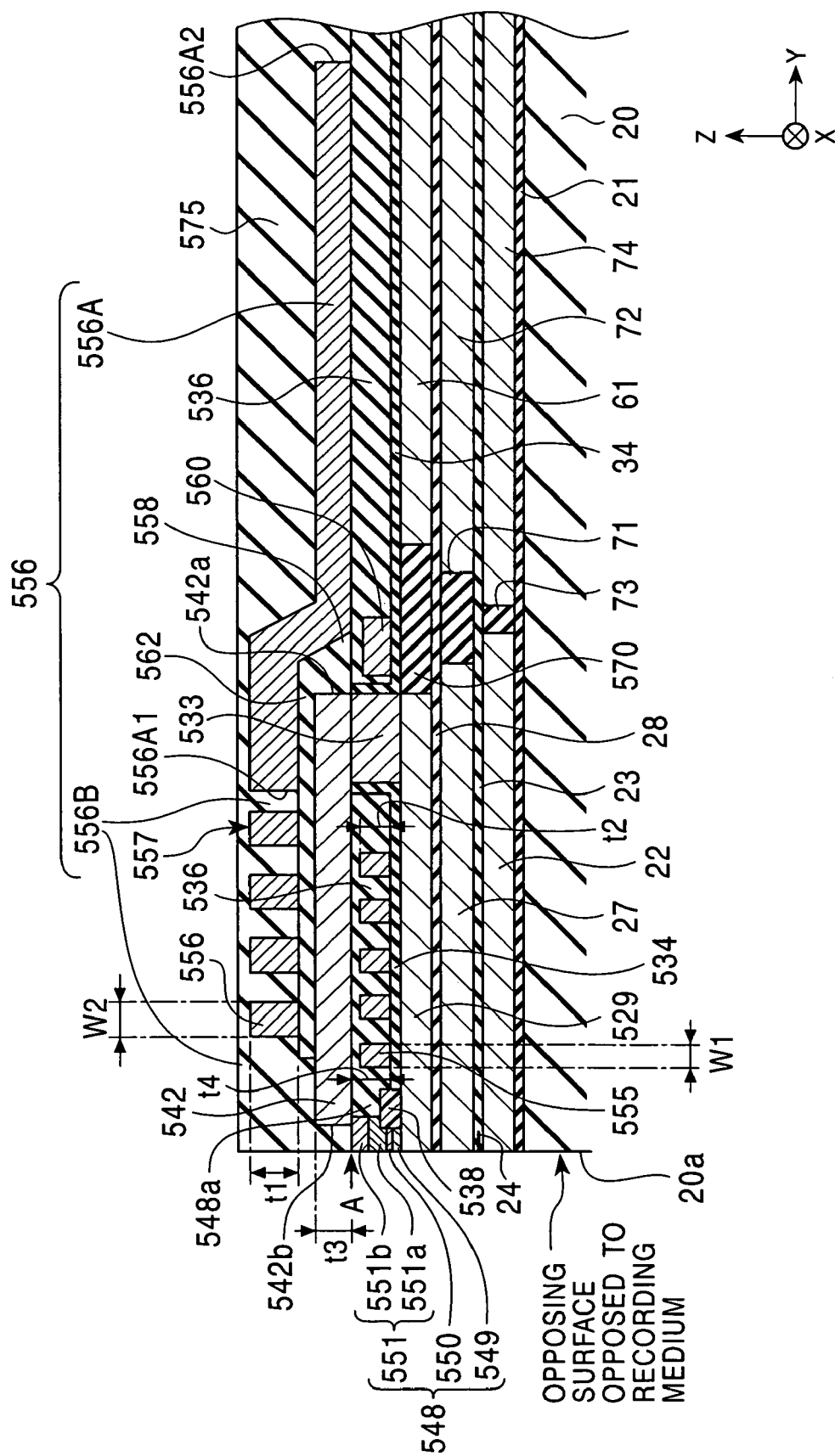
FIG. 10 is a longitudinal sectional view illustrating the structure of a thin-film magnetic head according to a sixth embodiment of the present invention.

FIG. 10 is a longitudinal sectional view in part illustrating the structure of a thin-film magnetic head according to a sixth embodiment of the present invention.

A playback head formed by the lower shielding layer 22 to the upper shielding layer 27 is the same as those of the thin-film magnetic heads according to the first to fifth embodiments.

As shown in FIG. 10, the upper shielding layer 27 has the separating layer 28 formed thereon, composed of $Al_2O_3$ or the like. Meanwhile, the upper gap layer may have a lower core layer 529, which will be described below, without providing the upper shielding layer 27 and the separating layer 28. In such a case, the lower core layer 529 also serves as an upper shielding layer.

In the configuration shown in FIG. 10, the separating layer 28 has the lower core layer 529 formed thereon. The lower core layer 529 is composed of a magnetic material such as a NiFe-base alloy. The lower core layer 529 is formed so as to have a predetermined length from the opposing surface opposed to a recording medium in the height direction (in the Y-direction indicated in the figure).

As shown in FIG. 10, the lower core layer 529 has a magnetic-pole end layer (also, referred to as a magnetic-pole end) (a raised layer) 548 formed thereon so as to have a predetermined length and to extend backward from the opposing surface opposed to the recording medium in the height direction. The magnetic-pole end layer 548 is also formed so as to have a track width Tw in the track-width direction (in the X-direction indicated in the figure). The track width Tw is formed so as to be, for example, not greater than 0.5 µm.

In the embodiment shown in FIG. 10, the magnetic-pole end layer 548 has a laminated structure formed by three layer films of a lower magnetic pole layer 549, a gap layer 550, and an upper magnetic pole layer 551. The magnetic pole layers 549 and 551 and the gap layer 550 will be described below.

The lower core layer 529 has the lower magnetic pole layer 549 formed thereon by plating so as to serve as the lowest layer of the magnetic-pole end layer 548. The lower magnetic pole layer 549 is composed of a magnetic material and is magnetically connected to the lower core layer 529. The lower magnetic pole layer 549 may be composed of the same material as or a different material from that of the lower core layer 529 and be formed of a single-layered film or a multi-layered film.

The lower magnetic pole layer 549 has the nonmagnetic gap layer 550 laminated thereon.

The gap layer 550 is preferably composed of a nonmagnetic metal material and formed by plating on the lower magnetic pole layer 549. The nonmagnetic metal material is preferably selected from at least one of NiP, NiReP, NiPd, NiW, NiMO, NiRh, NiRe, Au, Pt, Rh, Pd, Ru, and Cr, and the gap layer 550 may be formed of a single-layered film or a multi-layered film.

The gap layer 550 has the upper magnetic pole layer 551 formed thereon by plating so as to be magnetically connected to an upper core layer 542, which will be described later. In this embodiment, the upper magnetic pole layer 551 has a laminated structure formed by lower and upper layers 551a and 551b. The lower and upper layers 551a and 551b are composed of a magnetic material, and the lower layer 551a has a higher saturation flux density than that of the upper layer 551b.

When the gap layer 550 is composed of a nonmagnetic metal material as described above, the lower magnetic pole layer 549, the gap layer 550, and the upper magnetic pole layer 551 can be continuously formed by plating.

In addition, the lower core layer 529 has a back gap layer 533 formed thereon so as to lie away from a rear end surface 548a of the magnetic-pole end layer 548 by a predetermined distance in the height direction (in the Y-direction indicated in the figure).

The back gap layer 533 is composed of a magnetic material, which may be the same as or different from that of the lower core layer 529. Also, the back gap layer 533 may be formed of a single-layered or multi-layered laminate. The back gap layer 533 is magnetically connected to the lower core layer 529.

The lower core layer 529 has a coil-insulating underlying layer 534 formed thereon and toward the back gap layer 533, and the coil-insulating underlying layer 534 has a plurality of first coil pieces 555 juxtaposed in the height direction so as to extend in parallel with one another in the track-width direction (in the X-direction indicated in the figure). Meanwhile, each first coil piece 555 may extend so as to lean from the track-width direction (the X-direction indicated in the figure) toward the height direction.

The first coil pieces 555 have a coil insulating layer 536 filled in the above space thereof, composed of an inorganic insulating material such as $Al_2O_3$. As shown in FIG. 10, the upper surfaces of the magnetic-pole end layer 548, the coil insulating layer 536, and the back gap layer 533 form a continuous planarized surface extending along the reference surface A shown in FIG. 10.

As shown in FIG. 10, the lower core layer 529 has a Gd defining layer 538 formed thereon so as to extend from a position away from the opposing surface opposed to the recording medium by a predetermined distance in the height direction (in the Y-direction indicated in the figure). Also, as shown in FIG. 10, the rear end of the upper magnetic pole layer 551 is placed on the Gd defining layer 538. The gap depth (Gd) is defined by the length of the gap layer 550 in the height direction (in the Y-direction indicated in the figure), extending from the opposing surface opposed to the recording medium to the Gd defining layer 538 against which the gap layer abuts.

The upper magnetic pole layer 551 and the back gap layer 533 have an upper core layer (a magnetic layer) 542 formed thereon by plating. The upper core layer 542 connects a portion of the lower core layer 529 on the rear side in the height direction and the magnetic-pole end layer 548 having the back gap layer 533 interposed therebetween, and the upper core layer 542 corresponds to a magnetic layer of the present invention.

The upper magnetic pole layer 551 and the upper core layer 542 may be composed of the same material; however, these layers are preferably composed of different materials from each other. Especially, the upper core layer 542 preferably has a lower saturation flux density than that of the upper layer 551b of the upper magnetic pole layer 551. The saturation flux density of the upper core layer 542 is in the range from 1.4 T to 1.9 T, for example. The saturation flux densities of the lower and upper layers of the upper magnetic pole layer 551 are respectively in the ranges from 1.9 T to 2.4 T and from 1.4 T to 1.9 T, for example.

When the saturation flux density of the upper core layer 542 is lower than that of the upper magnetic pole layer 551, magnetic recording caused by a magnetic field leaked from the upper core layer 542 can be easily prevented.

As shown in FIG. 10, the upper core layer 542 has an insulating layer 558 formed thereon, composed of an insulating material such as $Al_2O_3$. The insulating layer 558 is preferably composed of an inorganic insulating material.

As shown in FIG. 10, the insulating layer 558 has a plurality of second coil pieces 556 formed thereon.

The ends of each first coil piece 555 and the corresponding second coil piece 556, lying in the track-width direction, are electrically connected to each other, and a toroidal coil layer 557 having the first and second coil pieces 555 and 556 wound around the upper core layer 542 is formed.

The toroidal coil layer 557 has a protecting layer 575 formed thereon, composed of an insulating material such as $Al_2O_3$ or AlSiO.

When a recording current is supplied to the coil layer 557, a recording magnetic field is induced in the lower core layer 529 and the upper core layer 542 so as to generate a leakage magnetic field between the lower and upper magnetic pole layers 549 and 551 opposed to each other, having the gap layer 550 interposed therebetween, and with this leakage magnetic field, a magnetic signal is stored in the recording medium such as a hard disk.

Figure 11:
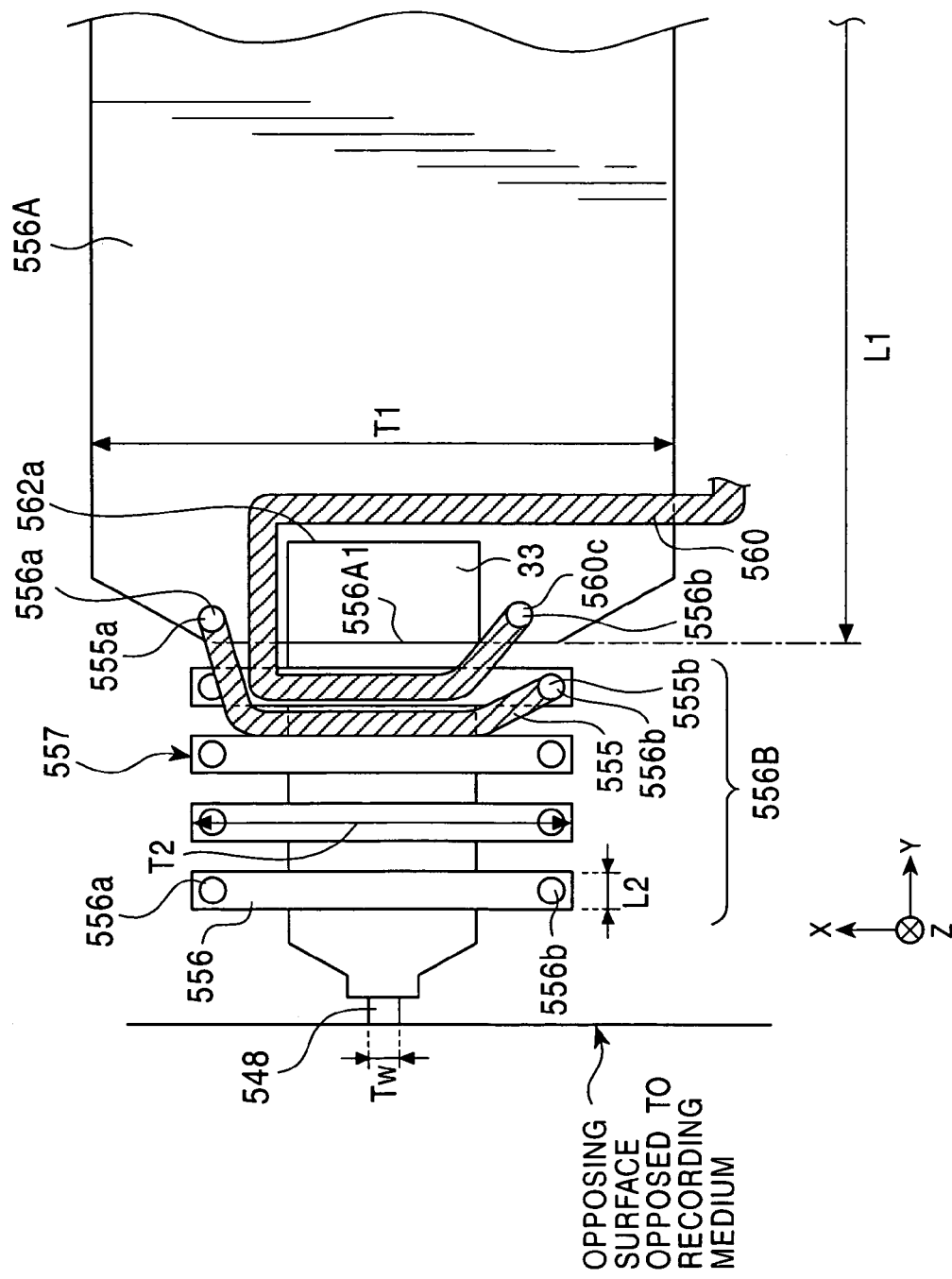
FIG. 11 is a partial plan view of the thin-film magnetic head shown in FIG. 10.

FIG. 11 is a partial plan view of the magnetic head shown in FIG. 10, viewed from the above in the figure.

Of the second coil pieces 556, a rearmost second coil piece 556A lying farthest away from the opposing surface opposed to the recording medium (that is, lying remotest in the height direction (in the Y-direction indicated in the figure)) has a larger area than that of a plurality of the other second coil pieces 556 (hereinafter, the plurality of other second coil pieces 556 are called "other second coil pieces 556B") formed forward thereof, i.e., closer to the opposing surface.

Also, the rearmost second coil piece 556A has a larger width in the track-width direction (in the X-direction indicated in the figure) than that of the other second coil pieces 556B. Meanwhile, the "track width" mentioned here means the maximum one of the track widths.

In addition, the rearmost second coil piece 556A has a larger length in the height direction (in the Y-direction indicated in the figure) than that of the other coil pieces 556B. Meanwhile, the "length in the height direction" mentioned here means the maximum one of the lengths.

As shown in FIG. 10, the rearmost second coil piece 556A has a rear end 556A2 formed at a further extended position in the height direction (in the Y-direction indicated in the figure) than a rear end 542a of the upper core layer 542, and the rearmost second coil piece 556A overlies the rear region of the upper core layer 542.

In this embodiment, the rearmost second coil piece 556A is able to serve as a heat transfer layer for releasing Joule heat generated in the toroidal coil layer 557 backward thereof in the height direction. Also, in the thin-film magnetic recording head, heat is generated due to eddy currents in the lower core layer 529, the upper core layer 542, the magnetic-pole end layer 548, and the back gap layer 533, and this heat is also transferred to the rearmost second coil piece 556A.

As mentioned above, the rearmost second coil piece 556A has a larger width T1 in the track-width direction than that of the other second coil pieces 556B; accordingly, Joule heat and the like generated from the toroidal coil layer 557 are easily transferred to the wide rearmost second coil piece 556A. Also, since the rearmost second coil piece 556A has a larger area than that of the other second coil pieces 556B, it has a larger heat capacity than that of the other coil pieces, whereby the Joule heat and the like emitted from the toroidal coil layer 557 are easily released to the rearmost second coil piece 556A.

In addition, the rear end 556A2 of the rearmost second coil piece 556A is formed at a further extended position in the height direction than the rear end 542a of the upper core layer 542, whereby heat is easily released toward the rear region of the upper core layer 542.

Although the rearmost second coil piece 556A may have any flat shape, desirably it completely covers a portion of the upper core layer 542 from the above, opposed thereto in the film-thickness direction from a front end surface 556A1 of the second coil piece 556A to backward of the same in the height direction, and also extends outside both sides of the upper core layer 542 in the track-width direction and in the rear region extending immediately backward of the upper core layer 542. In the meantime, in this state, preferably no second coil piece 556A is formed right below each of the terminals 2 and 3 shown in FIG. 1 in order to allow the terminals 2 and 3 to be easily connected to a lead layer connected to the toroidal coil layer 557 and another lead layer connected to the mognetoresistive element 24.

Also, in the magnetic head shown in FIG. 10, the rearmost second coil piece 556A has two connection portions 556a and 556b.

Of these connecting portions, the one connecting portion 556a is electrically connected to one connecting portion 555a of the first coil piece 555, both connecting portions opposed to each other in the film-thickness direction thereof (in the Z-direction indicated in the figure), directly or having an independent connecting layer (not shown) interposed therebetween. Also, the other connecting portion 556b is electrically connected to a connecting portion 560c of a lead layer 560, both connecting portions opposed to each other in the film-thickness direction thereof, directly or having an independent connecting portion therebetween. The lead layer 560 extends substantially half around the back gap layer 533 and outside the rearmost second coil piece 556A. Thus, the base end (not shown) of the lead layer 560 is connected to one of the terminals 2. Although not shown in FIG. 10, a lead layer is also opposed to the connecting portion 556a of the foremost second coil piece 556 from below, the lead layer and the connecting portion 556a of the second coil piece 556 are electrically connected to each other, and the base end of the lead layer is connected to the other terminal 2.

For example, the first coil pieces 555 and the lead layer 560 are formed in the same step and also on the common coil-insulating underlying layer 534.

As described above, the rearmost second coil piece 556A has the pair of connection portions 556a and 556b spaced away from each other in the track-width direction, and, also in the rearmost second coil piece 556A, a recording current flows between the connection portions 556a and 556b; thus, the rearmost second coil piece 556A serves so as to generate flux coupling with the upper core layer 542.

As described above, the rearmost second coil piece 556A has a structure in which the rear end 556A2 thereof lies at a further extended position in the height direction than the rear end 542a of the upper core layer 542, whereby the two connecting portions 556a and 556b of the rearmost second coil piece 556A can be formed so as to lie close to the opposing surface opposed to the recording medium.

Since a recording current passes through the shortest path, in the rearmost second coil piece 556A, it flows between the two connection portions 556a and 556b. When the two connection portions 556a and 556b are formed so as to lie as close to the opposing surface opposed to the recording medium as possible, the second coil piece 556A in which substantially no recording current flows and accordingly no Joule heat is generated can be formed backward of the connecting portions 556a and 556b in the height direction so as to have a vast area, whereby the second coil piece 556A extending backward of the connecting portions 556a and 556b is able to serve as a genuine heat-dissipating region.

Also, as shown in FIG. 10, the front end surface 556A1 of the rearmost second coil piece 556A lying close to the opposing surface opposed to the recording medium interlinks with the upper core layer 542 in the film-thickness direction (in the Z-direction indicated in the figure), resulting in a preferable structure for increasing flux coupling. Also, in this state, the two connection portions 556a and 556b formed on the rearmost second coil piece 556A are disposed outside both sides of the upper core layer 542 in the track-width direction.

Similar to the other second coil pieces 556B, the rearmost second coil piece 556A is composed of at least one nonmagnetic metal material selected from, for example, Au, Ag, Pt, Cu, Cr, Al, Ti, Sn, NiP, Mo, W, Pd, Rh, and Ni. Alternatively, it may have a laminated structure in which some of these nonmagnetic metal materials are laminated. The rearmost second coil piece 556A has a higher thermal conductivity than an insulating layer such as the protecting layer 575 formed thereon or the coil insulating layer 536 formed thereunder. Accordingly, a major part of Joule heat and the like generated from the toroidal coil layer 557 is easily transferred to the rearmost second coil piece 556A, whereby the heat is easily released backward of the upper core layer 542 in the height direction.

Then, in the same fashion as in the embodiment shown in FIG. 2, the heat reached to the rearmost second coil piece 556A is transferred to the, first metal layer 61, the second metal layer 72, and the third metal layer 74, respectively formed backward of the lower core layer 529, the upper shielding layer 27, and the lower shielding layer 22 in the height direction and is then easily released from the third metal layer 74 to the slider 20.

The shapes, the forming positions, and the materials of the first metal layer 61, the second metal layer 72, and the third metal layer 74 are the same as those of the first to third metal layers 61, 72, and 74 of the magnetic head shown in FIG. 2.

In the meantime, none of the first to third metal layers 61, 72, and 74 may be disposed, or at least one of these metal layers may be disposed.

In the present embodiment, by forming the upper core layer 542 and the upper magnetic pole layer 551 of the magnetic-pole end layer 548 with different materials from each other, only the upper magnetic pole layer 551 can be composed of a material having a high saturation flux density, and the upper core layer 542 can be composed of a material having a lower saturation flux density than that of the upper magnetic pole layer 551. Also, since the upper and lower magnetic pole layers 551 and 549 having a high saturation flux density are not formed backward of the Gd defining layer 538, the flux density of the coil layer 557 can be properly adjusted, thereby reducing flux leakage from both sides of the magnetic-pole end layer 548 and thus improving an S/N ratio of the magnetic head.

Also, by disposing a front end surface 542b of the upper core layer 542 further backward from the opposing surface opposed to the recording medium in the height direction, flux leakage from the upper core layer 542 can be further reduced.

Also, in the present embodiment, when the film thickness t1 of the second coil pieces 556 above the upper core layer 542 is greater than the film thickness t2 of the first coil pieces 555, and in addition, the length W2 of each second coil piece in a first direction perpendicular to the direction along which a current of the second coil piece flows is greater than the length W1 of each first coil piece in the first direction, the resistance of the magnetic head of the coil layer 557 can be reduced. In other words, the coil layer 557 is prevented from generating heat and thus from protruding toward the recording medium in the vicinity of the magnetic pole end 548.

Since the magnetic head shown in FIGS. 10 and 11 has a magnetic path formed by connecting the upper surfaces of the magnetic pole end 548 and the back gap layer 533 with the upper core layer 542 having a flat shape, the magnetic path can be made shorter than that of a magnetic head formed by raising an upper core layer thereof. Also, since the upper core layer 542 has a flat shape, Joule heat generated in the coil layer 557 can be effectively released outside the magnetic head.

In addition, the coil layer 557 has a toroidal coil structure formed by winding the coil pieces around the upper core layer 542.

With this structure, even when the winding number of the coil layer 557 constituting the magnetic head is decreased, since the magnetic head can maintain a certain level of recording feature, the coil resistance of the coil layer 557 can be reduced by decreasing the winding number, thereby preventing the magnetic head from generating heat even when the magnetic head is being driven.

When the magnetic head is prevented from generating heat, problems, for example, the one in that the magnetic pole end 548 and the vicinity thereof protrude from the opposing surface opposed to the recording medium can be prevented.

In addition, by using an inorganic insulating material for the coil insulating layer 536 covering the first coil pieces 555, the magnetic head has a reduced thermal expansion coefficient.

Also, the magnetic path is formed by connecting the upper surfaces of the magnetic-pole end layer 548 and the back gap layer 533 with the flat upper core layer 542 having the upper surface extending in parallel to the above surfaces, thereby making the magnetic path shorter. The shorter magnetic path makes a magnetic reverse speed higher, thereby achieving a thin-film magnetic head having an excellent high-frequency characteristic.

Figure 12:
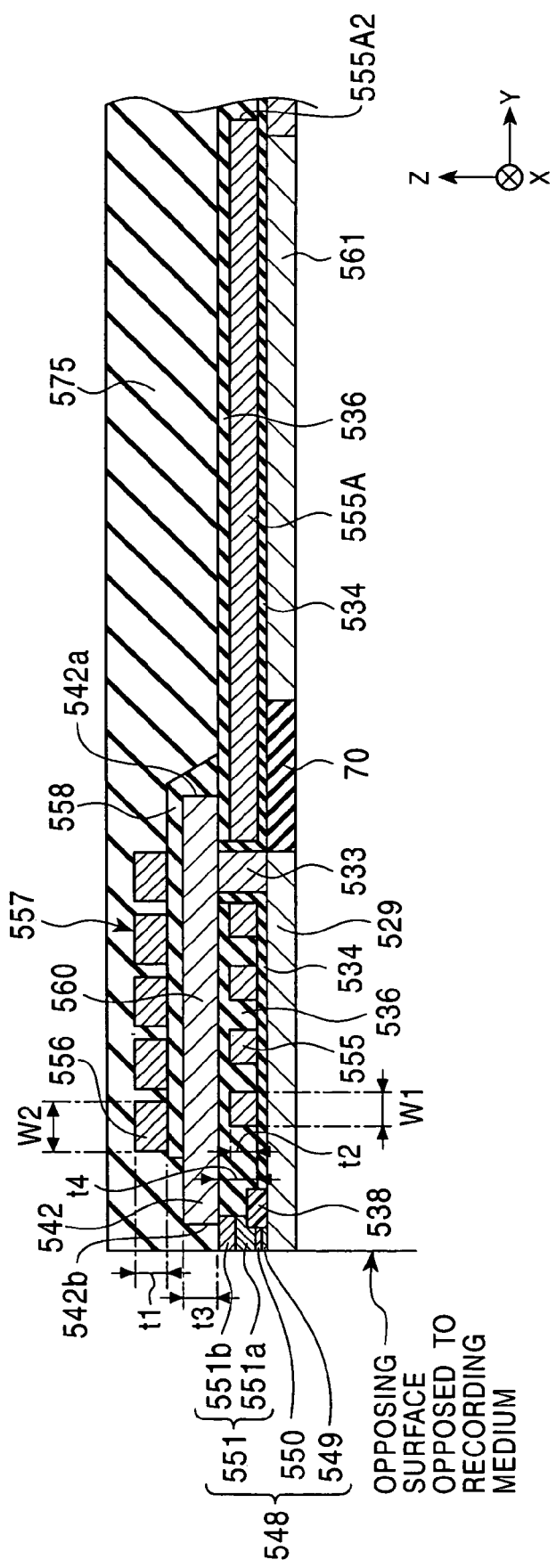
FIG. 12 is a longitudinal sectional view illustrating the structure of a thin-film magnetic head according to a seventh embodiment of the present invention.
Figure 13:
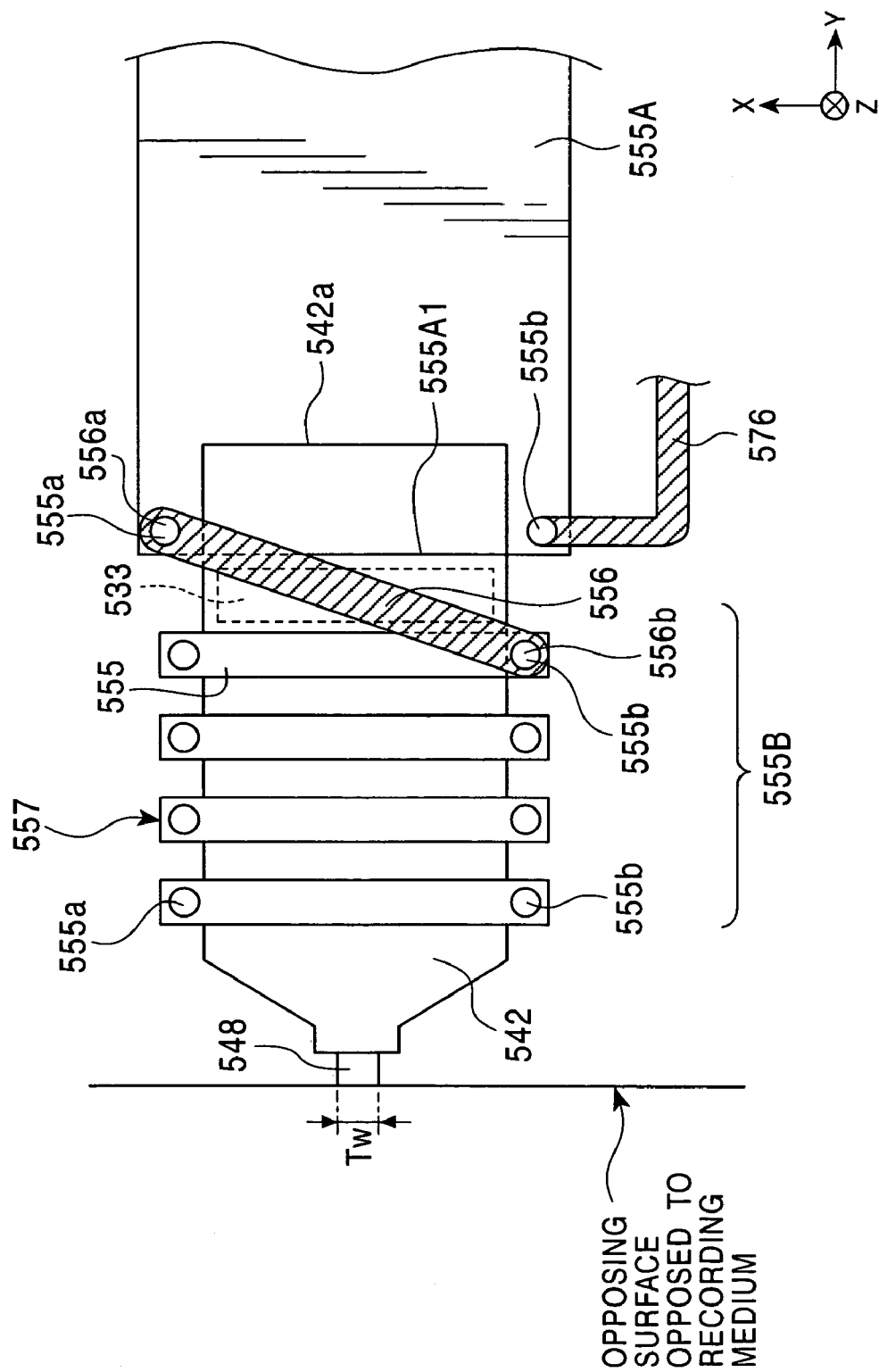
FIG. 13 is a partial plan view of the thin-film magnetic head shown in FIG. 12.

FIG. 12 is a sectional view in part illustrating the structure of a thin-film magnetic head according to a seventh embodiment of the present invention, and FIG. 13 is a partial plan view of the thin-film magnetic head shown in FIG. 12. Layers denoted by the same reference numerals as in FIGS. 10 and 11 represent the same layers as those shown in FIGS. 10 and 11. Also, although only an inductive head serving as a recording thin-film magnetic head is illustrated in FIG. 12, a playback MR head may be disposed under the inductive head in the same fashion as in the configuration shown in FIG. 10.

In the thin-film magnetic head shown in FIG. 12, of the plurality of first coil pieces 555 disposed below the upper core layer 542, a rearmost first coil piece 555A lying remotest from the opposing surface opposed to a recording medium in the height direction has a larger width in the track-width direction and a larger area than those of a plurality of first coil pieces 555B (hereinafter, these coil pieces are called other first coil pieces 555B) disposed forward thereof.

The rearmost first coil piece 555A has a rear end 555A2, formed at a further extended position in the height direction (in the Y-direction indicated in the figure) than the rear end 542a of the upper core layer 542, and the rearmost first coil piece 555A underlies the rear region of the upper core layer 542 in the height direction.

FIG. 13 illustrates all first coil pieces 555, a part of the second coil pieces 556, the upper core layer 542, and a lead layer 576, all constituting the thin-film magnetic head shown in FIG. 12.

As shown in FIG. 13, both ends of each first coil piece 555 in the track-width direction (in the X-direction indicated in the figure) serve as the connecting portion 555a and a connecting portion 555b. Also, both ends of each second coil piece 556 in the track-width direction serve as the connection portions 556a and 556b. As shown in FIG. 13, the one connecting portion 555a of the rearmost first coil piece 555A and the one connecting portion 556a of the rearmost second coil piece 556A, both opposed to each other in the film-thickness direction (in the Z-direction indicated in the figure), are connected to each other directly or having an independent connecting layer (not shown) interposed therebetween, and the other connecting portion 556b of the rearmost second coil piece 556A is connected to the connecting portion 555b of the first coil piece 555 lying immediately in front of the rearmost first coil piece 555A, directly or having an independent connecting layer (not shown) interposed therebetween. When each first coil piece 555 and the corresponding second coil pieces 556 are connected in a zigzag manner as mentioned above, these coil piece are wound around the upper core layer 542 so as to form the toroidal coil layer 557.

As shown in FIG. 13, the rearmost first coil piece 555A has the two connecting portions 555a and 555b, and while the one connecting portion 555a is connected to the connecting portion 556a of the rearmost second coil piece 556A as descried above, the other connecting portion 555b is connected to the lead layer 576, directly or having an independent connecting layer (not shown) interposed therebetween. The lead layer 576 is formed in the same step and composed of the same material as those of the second coil pieces 556.

The lead layer 576 is formed so as to extend above and from the insulating layer 558 to the coil insulating layer 536, and the base end of the lead layer 576 extends outside the rearmost first coil piece 555A so as to be connected to one of the terminals 2.

As shown in FIGS. 12 and 13, the rear end 542a of the upper core layer 542 is formed at a further extended position in the height direction than the rear end of the back gap layer 533, and the rearmost first coil piece 555A has a front end surface 555A1 interlinking with the upper core layer 542 in the film-thickness direction (in the Z-direction indicated in the figure).

Also in the thin-film magnetic head shown in FIGS. 12 and 13, in the same fashion as in the thin-film magnetic head shown in FIGS. 10 and 11, the rearmost first coil piece 555A serves as a coil layer for generating flux coupling and also as a heat transfer layer for releasing heat generated in the toroidal coil layer 557 outside.

The rearmost first coil piece 555A has the same configuration and the same working effect as those of the rearmost second coil piece 556A illustrated in FIGS. 10 and 11.

Figure 14:
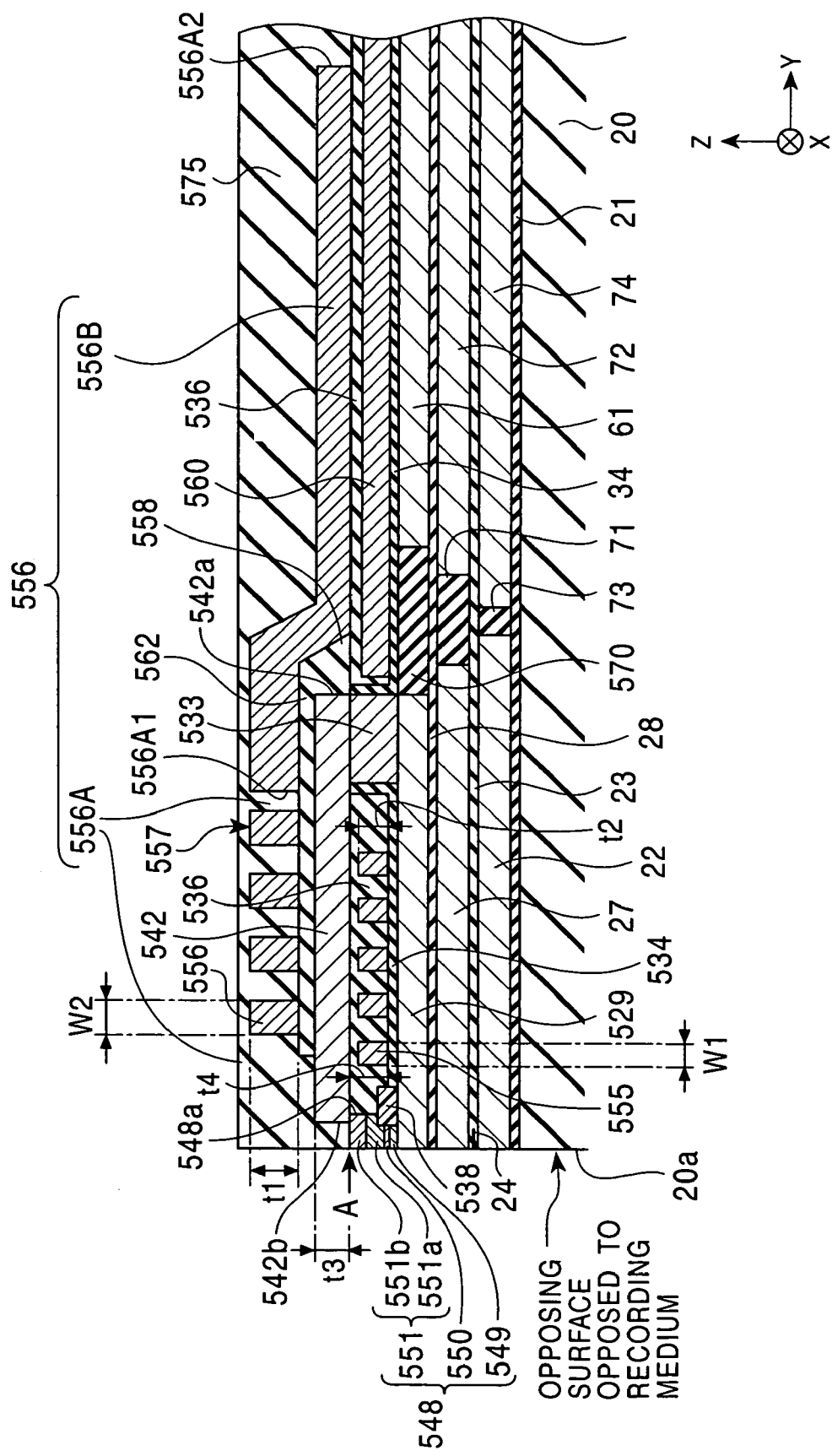
FIG. 14 is a longitudinal sectional view illustrating the structure of a thin-film magnetic head according to an eighth embodiment of the present invention.
Figure 15:
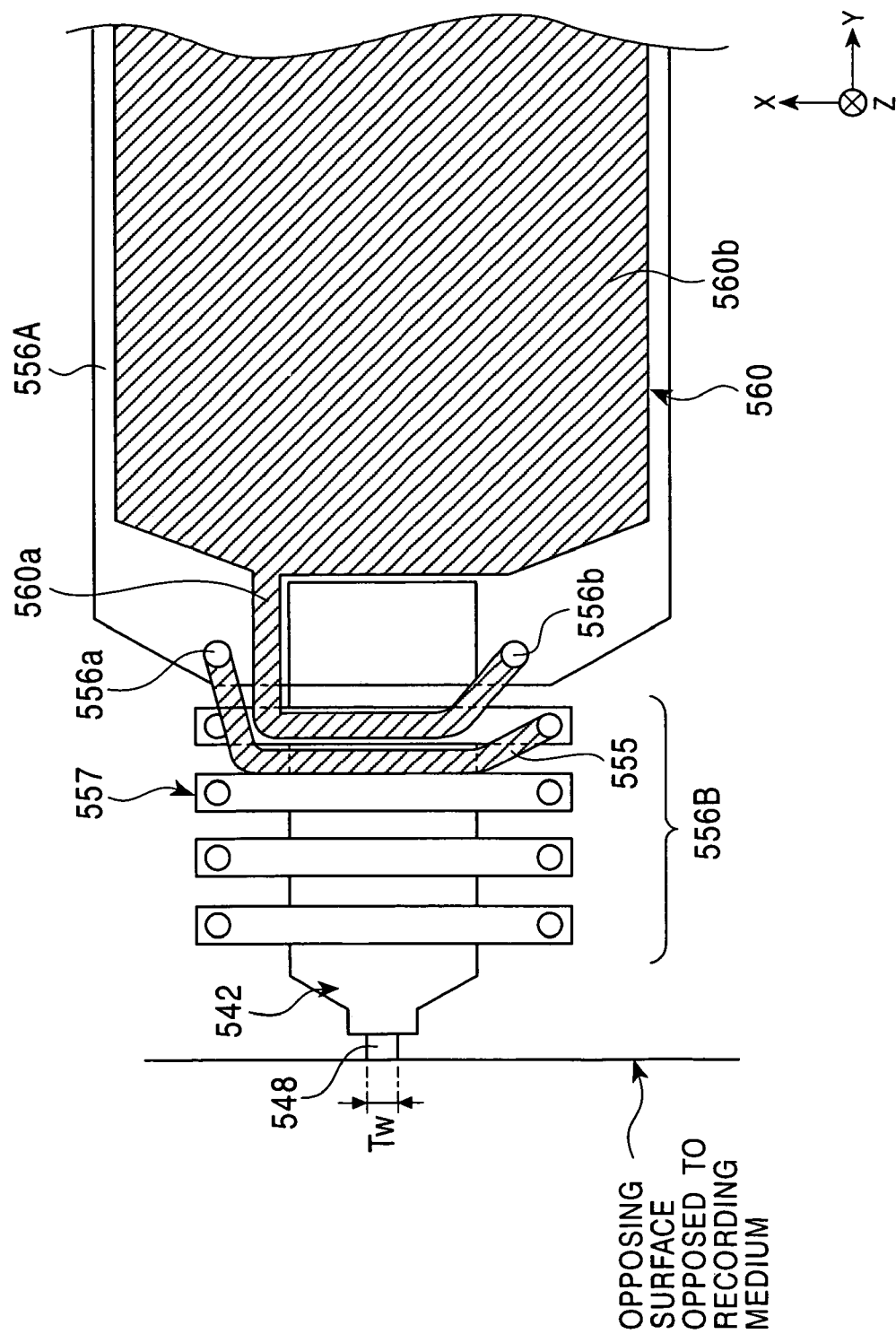
FIG. 15 is a partial plan view of the thin-film magnetic head shown in FIG. 14.

FIG. 14 is a longitudinal sectional view in part illustrating the structure of a thin-film magnetic head according to an eighth embodiment of the present invention, and FIG. 15 is a partial plan view of the thin-film magnetic head shown in FIG. 14. Layers denoted by the same reference numerals as in FIGS. 2 and 3 represent the same layers as those shown in FIGS. 2 and 3.

In the embodiment shown in FIG. 14, the rearmost second coil piece 556A has a larger width in the track-width direction and a larger area than those of the other second coil pieces 556B, and this configuration is the same as that shown in FIGS. 2 and 3.

In the thin-film magnetic head shown in FIG. 14, as shown in FIG. 15, the lead layer 560 connected to the connecting portion 556b of the rearmost second coil piece 556A, directly or having an independent connecting layer (not shown) interposed therebetween, is formed by a lead front-end region 560a having a narrow width and a lead rear-end region 560b formed integrally with the lead front-end region 560a so as to be wider in the track-width direction than the lead front-end region 560a, and the lead front-end region 560b is disposed so as to be opposed to the rearmost second coil piece 556A in the film-thickness direction (in the Z-direction indicated in the figure).

The lead layer 560 is preferably formed in the same step as that of the first coil pieces 555 and composed of a nonmagnetic metal material such as copper in the same fashion as the first coil pieces 555.

The lead layer 560 extends further rearwards in the height direction so as to lie outside the forming region of the rearmost second coil piece 556A and is connected to one of the terminals 2 formed on the protecting layer 575.

In the configuration shown in FIGS. 14 and 15, by forming a lead front-end region 560b of the lead layer 560, opposed to the rearmost second coil piece 556A in the film-thickness direction, so as to have a larger area than that of a lead front-end region 560a, heat absorbed in the rearmost second coil piece 556A can be transferred to the first metal layer 61 and the below thereof, thereby more effectively releasing the heat outside.

In the thin-film magnetic head shown in FIGS. 14 and 15, although a part of Joule heat emitted from the toroidal coil layer 557 is directly transferred also to the lead rear-end region 560b of the lead layer 560, the lead front-end region 560a narrower than the lead rear-end region 560b does not substantially work as a heat transfer path, and also, because of being disposed backward of the back gap layer 533, the lead rear-end region 560b lies remotely away from the first coil pieces 555 and so forth. Accordingly, it is expected that the Joule heat generated from the toroidal coil layer 557 is easily transferred to the rearmost second coil piece 556A disposed closer to the first and second coil pieces 555 and 556 and having a large area as a whole. And also, it is expected that the heat is then transferred from the rearmost second coil piece 556A to the lead rear-end region 560b formed thereunder.

The thin-film magnetic head according to the present invention described in detail above is built in a magnetic head apparatus installed in, for example a hard disk apparatus. The thin-film magnetic head may be built in either a floating magnetic head or a contact-type magnetic head. Also, the thin-film magnetic head may be used for a magnetic sensor and the like other than the hard disk apparatus.

What is claimed is:

1. A thin-film magnetic head, comprising:
  a lower core layer extending from a surface of the thin-film magnetic head opposed to a recording medium in a height direction;
  a magnetic upper core layer extending above and away from the lower core layer by a predetermined distance, the magnetic upper core layer coupled to the lower core layer on a rear side in the height direction;
  a toroidal coil layer comprising a plurality of first coil pieces disposed below the magnetic upper core layer and a plurality of second coil pieces disposed above the magnetic upper core layer, the first and second coil pieces being wound around the magnetic upper core layer, wherein each of the plurality of first coil pieces is electrically connected in a track-width direction to a corresponding second coil piece; and
  a lead layer, the lead layer connected to the toroidal coil layer and supplying a recording current thereto,
  wherein a rearmost first or second coil piece lying furthest from the opposing surface in the height direction has a larger width in a width direction and a larger area than other coil pieces corresponding to said rearmost first or second coil piece, the rearmost first or second coil piece comprising two connecting portions, a first connecting portion connectively opposed to one of the other corresponding coil pieces in the film-thickness direction, and a second connecting portion connected to the lead layer; and
  wherein the first and second connecting portions are formed near a front end side of the rearmost first or second coil piece closest to the surface opposed to the recording medium.

2. The thin-film magnetic head according to claim 1, wherein a front end surface of the rearmost coil piece overlaps the magnetic upper core layer in the film-thickness direction.

3. The thin-film magnetic head according to claim 1, wherein the rearmost coil piece has a rear end formed at a further extended position in the height direction than that of the magnetic upper core layer.

4. The thin-film magnetic head according to claim 1, wherein a length of each second coil piece in a first direction perpendicular to the direction along which a current of the second coil piece flows is greater than that of each first coil piece in the first direction.

5. The thin-film magnetic head according to claim 1, wherein a film thickness of the second coil pieces is greater than that of the first coil pieces.

6. a lower core layer extending from a surface of the thin-film magnetic head opposed to a recording medium in a height direction;
  a magnetic upper core layer extending above and away from the lower core layer by a predetermined distance, the magnetic upper core layer connected to the lower core layer on a rear side in the height direction;
  a toroidal coil layer comprising a plurality of first coil pieces disposed below the magnetic upper core layer and a plurality of second coil pieces disposed above the magnetic upper core layer, the first and second coil pieces being wound around the magnetic upper core layer, wherein each of the plurality of first coil pieces is electrically connected in a track-width direction to a corresponding second coil piece; and
  a lead layer, the lead layer connected to the toroidal coil layer and supplying a recording current thereto,
  wherein a rearmost first or second coil piece lying furthest from the opposing surface in the height direction has a larger width in a width direction and a larger area than other coil pieces corresponding to said rearmost first or second coil piece;
  wherein the rearmost coil piece has a rear end formed at a further extended position in the height direction than that of the magnetic upper core layer; and
  wherein a first metal layer is separately formed to the rear of the lower core layer in the height direction or integrally formed therewith, such that a part of the first metal layer overlaps with the rearmost coil piece in the film-thickness direction.

7. a lower core layer extending from a surface of the thin-film magnetic head opposed to a recording medium in a height direction;
  a magnetic upper core layer extending above and away from the lower core layer by a predetermined distance, the magnetic upper core layer connected to the lower core layer on a rear side in the height direction;
  a toroidal coil layer comprising a plurality of first coil pieces disposed below the magnetic upper core layer and a plurality of second coil pieces disposed above the magnetic upper core layer, the first and second coil pieces being wound around the magnetic upper core layer, wherein each of the plurality of first coil pieces is electrically connected in a track-width direction to a corresponding second coil piece; and a lead layer, the lead layer connected to the toroidal coil layer and supplying a recording current thereto, wherein a rearmost first or second coil piece lying furthest from the opposing surface in the height direction has a larger width in a width direction and a larger area than other coil pieces corresponding to said rearmost first or second coil piece;

wherein the rearmost coil piece has a rear end formed at a further extended position in the height direction than that of the magnetic upper core layer;

wherein a playback head comprising an upper shielding layer, a lower shielding layer and a magnetoresistive element disposed between the upper and lower shielding layers is disposed below the lower core layer; and wherein a second metal layer is separately formed to the rear of the upper shielding layer in the height direction or integrally formed therewith, and at least a part of the second metal layer overlaps with the rearmost coil piece in the film-thickness direction.

8. a lower core layer extending from a surface of the thin-film magnetic head opposed to a recording medium in a height direction;

a magnetic upper core layer extending above and away from the lower core layer by a predetermined distance, the magnetic upper core layer connected to the lower core layer on a rear side in the height direction;

a toroidal coil layer comprising a plurality of first coil pieces disposed below the magnetic upper core layer and a plurality of second coil pieces disposed above the magnetic upper core layer, the first and second coil pieces being wound around the magnetic upper core layer, wherein each of the plurality of first coil pieces is electrically connected in a track-width direction to a corresponding second coil piece; and a lead layer, the lead layer connected to the toroidal coil layer and supplying a recording current thereto, wherein a rearmost first or second coil piece lying furthest from the opposing surface in the height direction has a larger width in a width direction and a larger area than other coil pieces corresponding to said rearmost first or second coil piece;

wherein the rearmost coil piece has a rear end formed at a further extended position in the height direction than that of the magnetic upper core layer, and wherein a third metal layer is separately formed to the rear of the lower shielding layer in the height direction or integrally formed therewith, and at least a part of the third metal layer overlaps with the rearmost coil piece in the film-thickness direction.

9. a lower core layer extending from a surface of the thin-film magnetic head opposed to a recording medium in a height direction;

a magnetic upper core layer extending above and away from the lower core layer by a predetermined distance, the magnetic upper core layer connected to the lower core layer on a rear side in the height direction;

a toroidal coil layer comprising a plurality of first coil pieces disposed below the magnetic upper core layer and a plurality of second coil pieces disposed above the magnetic upper core layer, the first and second coil pieces being wound around the magnetic upper core layer, wherein each of the plurality of first coil pieces is electrically connected in a track-width direction to a corresponding second coil piece; and a lead layer, the lead layer connected to the toroidal coil layer and supplying a recording current thereto, wherein a rearmost first or second coil piece lying furthest from the opposing surface in the height direction has a larger width in a width direction and a larger area than other coil pieces corresponding to said rearmost first or second coil piece; and wherein a laminate comprising a lower magnetic pole layer, a gap layer, and an upper magnetic pole layer is formed over the lower core layer.

10. a lower core layer extending from a surface of the thin-film magnetic head opposed to a recording medium in a height direction;

a magnetic upper core layer extending above the lower core layer at a predetermined distance, the magnetic upper core layer connected to the lower core layer on a rear side in the height direction;

a toroidal coil layer comprising a plurality of first coil pieces disposed below the magnetic upper core layer and a plurality of second coil pieces disposed above the magnetic upper core layer, the first and second coil pieces being wound around the magnetic upper core layer, wherein each of the plurality of first coil pieces is electrically connected in a track-width direction to a corresponding second coil piece; and a lead layer, the lead layer connected to the toroidal coil layer and supplying a recording current thereto, wherein a rearmost first or second coil piece lying furthest from the opposing surface in the height direction has a larger width in a width direction and a larger area than other coil pieces corresponding to said rearmost first or second coil piece; and wherein the magnetic upper core layer is laminated on a magnetic-pole end layer having an end surface opposing the recording medium, wherein the magnetic-pole end layer is plated over the lower core layer and comprises a lower magnetic-pole layer, a gap layer composed of a nonmagnetic material, and an upper magnetic pole layer.

11. The thin-film magnetic head according to claim 10, wherein the magnetic upper core layer has a lower saturation flux density than that of the upper magnetic pole layer.

* * * * *

UNITED STATES PATENT AND TRADEMARK OFFICE
CERTIFICATE OF CORRECTION

| | |
|---|---|
| PATENT NO. | : 7,206,168 B2 |
| APPLICATION NO. | : 10/795094 |
| DATED | : April 17, 2007 |
| INVENTOR(S) | : Kiyoshi Sato et al. |

It is certified that error appears in the above-identified patent and that said Letters Patent is hereby corrected as shown below:

<u>In the Claims</u>

Column 24, in claim 6, line 1, before "lower core layer" delete "a" and substitute --A-- in its place.

Column 24, in claim 7, line 1, before "lower core layer" delete "a" and substitute --A-- in its place.

Column 25, in claim 8, line 1, before "lower core layer" delete "a" and substitute --A-- in its place.

Column 25, in claim 9, line 1, before "lower core layer" delete "a" and substitute --A-- in its place.

Column 26, in claim 10, line 1, before "lower core layer" delete "a" and substitute --A-- in its place.

Signed and Sealed this

Thirty-first Day of July, 2007

JON W. DUDAS
*Director of the United States Patent and Trademark Office*